(12) United States Patent
Ji et al.

(10) Patent No.: US 9,125,072 B2
(45) Date of Patent: Sep. 1, 2015

(54) HETEROGENEOUS NETWORK (HETNET) USER EQUIPMENT (UE) RADIO RESOURCE MANAGEMENT (RRM) MEASUREMENTS

(75) Inventors: Tingfang Ji, San Diego, CA (US); Osok Song, San Diego, CA (US); Aleksandar Damnjanovic, Del Mar, CA (US); Peter Gaal, San Diego, CA (US); Tao Luo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/085,151

(22) Filed: Apr. 12, 2011

(65) Prior Publication Data
US 2012/0088516 A1    Apr. 12, 2012

Related U.S. Application Data

(60) Provisional application No. 61/323,858, filed on Apr. 13, 2010.

(51) Int. Cl.
*H04W 72/00* (2009.01)
*H04W 24/02* (2009.01)
(Continued)

(52) U.S. Cl.
CPC ............. *H04W 24/02* (2013.01); *H04L 1/0027* (2013.01); *H04W 16/14* (2013.01);
(Continued)

(58) Field of Classification Search
CPC ... H04W 72/085; H04W 16/14; H04W 24/02; H04W 24/10; H04W 92/20; H04W 84/047; H04W 36/088; H04W 84/045; H04W 72/082; H04W 16/32; H04W 48/16; H04W 48/12; H04W 72/02; H04W 72/04; H04W 28/048; H04W 52/244; H04W 72/0406; H04W 72/0413; H04W 72/12; H04L 1/0027; H04L 5/0053; H04L 5/0094; H04J 11/005; H04J 11/0023; H04J 2211/001

USPC ......... 370/315, 311, 312, 352, 329, 336, 252, 370/241; 455/63.1, 456.1–456.6, 452.1, 455/67.11, 423, 500
See application file for complete search history.

(56) References Cited

U.S. PATENT DOCUMENTS

| 4,857,863 A | 8/1989 | Ganger et al. |
| 5,051,625 A | 9/1991 | Ikeda et al. |

(Continued)

FOREIGN PATENT DOCUMENTS

| CN | 1311968 A | 9/2001 |
| CN | 101018220 A | 8/2007 |

(Continued)

OTHER PUBLICATIONS

3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009, pp. 1-77, XP002602609.

(Continued)

*Primary Examiner* — Olumide T Ajibade Akonai
(74) *Attorney, Agent, or Firm* — Nerrie M. Zohn

(57) ABSTRACT

Methods and apparatus for performing radio resource management (RRM) measurements in a heterogeneous network (HetNet) are provided in an effort to prevent failure of RRM measurement procedures in a dominant interference scenario. Several alternatives are provided for determining particular resources (e.g., subframes) to use for performing the RRM measurements, wherein the particular resources are based on cooperative resource partitioning between cells of the HetNet, wherein the cells may be of different types (e.g., macro, pico, or femto cells). These alternatives include, for example: (1) intra-frequency or intra-RAT (radio access technology) alternatives, which may involve transmitting resource partitioning information (RPI) in or deriving non-serving cell RPI based on the serving cell's RPI, as well as (2) inter-frequency or inter-RAT alternatives, where the RRM measurements may be performed during a measurement gap.

92 Claims, 12 Drawing Sheets

(51) Int. Cl.
*H04L 1/00* (2006.01)
*H04W 16/14* (2009.01)
*H04W 72/08* (2009.01)
*H04J 11/00* (2006.01)
*H04W 16/02* (2009.01)
*H04W 28/04* (2009.01)
*H04W 84/04* (2009.01)
*H04W 24/10* (2009.01)
*H04W 36/00* (2009.01)

(52) U.S. Cl.
CPC ........... *H04W 72/085* (2013.01); *H04J 11/005* (2013.01); *H04J 11/0023* (2013.01); *H04W 16/02* (2013.01); *H04W 24/10* (2013.01); *H04W 28/048* (2013.01); *H04W 36/0088* (2013.01); *H04W 84/045* (2013.01); *H04W 84/047* (2013.01)

(56) References Cited

U.S. PATENT DOCUMENTS

| | | |
|---|---|---|
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,151,492 A | 11/2000 | Melin |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,630,339 B2 | 12/2009 | Laroia et al. |
| 7,652,533 B2 | 1/2010 | Wang et al. |
| 7,710,212 B2 | 5/2010 | Seliverstov |
| 7,742,444 B2 | 6/2010 | Mese et al. |
| 7,786,779 B2 | 8/2010 | Chang et al. |
| 7,795,902 B1 | 9/2010 | Yella |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,155,069 B2 | 4/2012 | Chun et al. |
| 8,174,995 B2 | 5/2012 | Malladi |
| 8,228,827 B2 | 7/2012 | Jeong et al. |
| 8,363,697 B2 | 1/2013 | Grob et al. |
| 8,446,869 B2 | 5/2013 | Lee et al. |
| 8,886,190 B2 | 11/2014 | Damnjanovic et al. |
| 2003/0043928 A1 | 3/2003 | Ling et al. |
| 2005/0064873 A1 | 3/2005 | Karaoguz et al. |
| 2005/0254555 A1 | 11/2005 | Teague et al. |
| 2005/0260990 A1 | 11/2005 | Huang et al. |
| 2006/0098604 A1 | 5/2006 | Flammer |
| 2006/0166693 A1 | 7/2006 | Jeong et al. |
| 2007/0064669 A1 | 3/2007 | Classon et al. |
| 2007/0087691 A1 | 4/2007 | Lee et al. |
| 2007/0104166 A1 | 5/2007 | Rahman et al. |
| 2007/0153719 A1 | 7/2007 | Gopal |
| 2007/0167181 A1 | 7/2007 | Ramesh et al. |
| 2007/0242763 A1 | 10/2007 | Li et al. |
| 2007/0253355 A1 | 11/2007 | Hande et al. |
| 2008/0008212 A1 | 1/2008 | Wang et al. |
| 2008/0013500 A1 | 1/2008 | Laroia et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0219236 A1 | 9/2008 | Love et al. |
| 2008/0220791 A1 | 9/2008 | Cho et al. |
| 2008/0227449 A1 | 9/2008 | Gholmieh et al. |
| 2008/0253300 A1 | 10/2008 | Wakabayashi et al. |
| 2008/0254804 A1 | 10/2008 | Lohr et al. |
| 2008/0260000 A1 | 10/2008 | Periyalwar et al. |
| 2008/0260062 A1 | 10/2008 | Imamura |
| 2008/0285513 A1 | 11/2008 | Jung et al. |
| 2009/0046605 A1* | 2/2009 | Gao et al. ............ 370/280 |
| 2009/0046674 A1* | 2/2009 | Gao et al. ............ 370/337 |
| 2009/0069023 A1 | 3/2009 | Ahn et al. |
| 2009/0088175 A1 | 4/2009 | Pelletier et al. |
| 2009/0103500 A1 | 4/2009 | Malkamaki et al. |
| 2009/0109915 A1 | 4/2009 | Pasad et al. |
| 2009/0135769 A1 | 5/2009 | Sambhwani et al. |
| 2009/0154458 A1 | 6/2009 | Kim et al. |
| 2009/0175214 A1 | 7/2009 | Sfar et al. |
| 2009/0196165 A1 | 8/2009 | Morimoto et al. |
| 2009/0196249 A1 | 8/2009 | Kawamura et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0213769 A1 | 8/2009 | Shen et al. |
| 2009/0238117 A1 | 9/2009 | Somasundaram et al. |
| 2009/0239590 A1 | 9/2009 | Parkvall |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1* | 11/2009 | Petrovic et al. ............ 370/312 |
| 2009/0298498 A1 | 12/2009 | Pisut et al. |
| 2009/0312024 A1 | 12/2009 | Chen et al. |
| 2009/0325626 A1 | 12/2009 | Palanki et al. |
| 2010/0008282 A1* | 1/2010 | Bhattad et al. ............ 370/312 |
| 2010/0022250 A1 | 1/2010 | Petrovic et al. |
| 2010/0029282 A1 | 2/2010 | Stamoulis et al. |
| 2010/0034135 A1 | 2/2010 | Kim et al. |
| 2010/0034158 A1* | 2/2010 | Meylan ............ 370/329 |
| 2010/0035600 A1 | 2/2010 | Hou et al. |
| 2010/0067472 A1 | 3/2010 | Ball et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0128690 A1* | 5/2010 | McBeath et al. ............ 370/329 |
| 2010/0144317 A1 | 6/2010 | Jung et al. |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1 | 10/2010 | Wei et al. |
| 2010/0260156 A1 | 10/2010 | Lee et al. |
| 2010/0265870 A1 | 10/2010 | Cai et al. |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1* | 12/2010 | Toh et al. ............ 370/252 |
| 2010/0309867 A1 | 12/2010 | Palanki et al. |
| 2010/0309876 A1 | 12/2010 | Khandekar et al. |
| 2010/0322180 A1 | 12/2010 | Kim et al. |
| 2010/0323611 A1 | 12/2010 | Choudhury |
| 2010/0331030 A1 | 12/2010 | Nory et al. |
| 2011/0007673 A1 | 1/2011 | Ahn et al. |
| 2011/0013554 A1 | 1/2011 | Koskinen |

(56) References Cited

U.S. PATENT DOCUMENTS

| | | | |
|---|---|---|---|
| 2011/0032890 A1 | 2/2011 | Wu | |
| 2011/0038271 A1 | 2/2011 | Shin et al. | |
| 2011/0044227 A1 | 2/2011 | Harrang et al. | |
| 2011/0044261 A1 | 2/2011 | Cai et al. | |
| 2011/0051684 A1 | 3/2011 | Li et al. | |
| 2011/0053603 A1 | 3/2011 | Luo et al. | |
| 2011/0064037 A1 | 3/2011 | Wei et al. | |
| 2011/0081865 A1 | 4/2011 | Xiao et al. | |
| 2011/0116364 A1* | 5/2011 | Zhang et al. | 370/216 |
| 2011/0116437 A1 | 5/2011 | Chen et al. | |
| 2011/0134875 A1 | 6/2011 | Ding et al. | |
| 2011/0149771 A1 | 6/2011 | Abeta et al. | |
| 2011/0149813 A1* | 6/2011 | Parkvall et al. | 370/280 |
| 2011/0170503 A1 | 7/2011 | Chun et al. | |
| 2011/0182245 A1 | 7/2011 | Malkamaki et al. | |
| 2011/0188481 A1 | 8/2011 | Damnjanovic et al. | |
| 2011/0190024 A1 | 8/2011 | Seong et al. | |
| 2011/0194514 A1 | 8/2011 | Lee et al. | |
| 2011/0199986 A1 | 8/2011 | Fong et al. | |
| 2011/0201279 A1 | 8/2011 | Suzuki et al. | |
| 2011/0205982 A1 | 8/2011 | Yoo et al. | |
| 2011/0211503 A1 | 9/2011 | Che et al. | |
| 2011/0243075 A1 | 10/2011 | Luo et al. | |
| 2011/0249643 A1* | 10/2011 | Barbieri et al. | 370/329 |
| 2011/0268032 A1 | 11/2011 | Kim et al. | |
| 2011/0274066 A1 | 11/2011 | Tee et al. | |
| 2011/0275394 A1 | 11/2011 | Song et al. | |
| 2011/0310789 A1 | 12/2011 | Hu et al. | |
| 2011/0317624 A1 | 12/2011 | Luo et al. | |
| 2012/0026892 A1 | 2/2012 | Nakao et al. | |
| 2012/0033588 A1 | 2/2012 | Chung et al. | |
| 2012/0033627 A1 | 2/2012 | Li et al. | |
| 2012/0033647 A1* | 2/2012 | Moon et al. | 370/336 |
| 2012/0039180 A1 | 2/2012 | Kim et al. | |
| 2012/0039208 A1 | 2/2012 | Aydin | |
| 2012/0087250 A1 | 4/2012 | Song et al. | |
| 2012/0093095 A1 | 4/2012 | Barbieri et al. | |
| 2012/0093097 A1 | 4/2012 | Che et al. | |
| 2012/0106481 A1* | 5/2012 | Cho et al. | 370/329 |
| 2012/0108239 A1 | 5/2012 | Damnjanovic et al. | |
| 2012/0108255 A1 | 5/2012 | Jo et al. | |
| 2012/0155366 A1 | 6/2012 | Zirwas et al. | |
| 2012/0182958 A1* | 7/2012 | Pelletier et al. | 370/329 |
| 2012/0212260 A1 | 8/2012 | Chen et al. | |
| 2012/0236798 A1 | 9/2012 | Raaf et al. | |
| 2012/0281656 A1 | 11/2012 | Hooli et al. | |
| 2013/0005344 A1 | 1/2013 | Dimou et al. | |
| 2013/0077576 A1 | 3/2013 | Abe et al. | |
| 2013/0250927 A1 | 9/2013 | Song | |
| 2014/0036838 A1 | 2/2014 | Yoo et al. | |
| 2014/0146798 A1 | 5/2014 | Damnjanovic et al. | |

FOREIGN PATENT DOCUMENTS

| | | |
|---|---|---|
| CN | 101090281 A | 12/2007 |
| CN | 101155399 | 4/2008 |
| CN | 101262680 A | 9/2008 |
| CN | 101316267 A | 12/2008 |
| CN | 101400130 A | 4/2009 |
| CN | 101483511 A | 7/2009 |
| CN | 101499882 A | 8/2009 |
| CN | 101505498 A | 8/2009 |
| CN | 101686580 A | 3/2010 |
| EP | 1811711 A1 | 7/2007 |
| EP | 2076066 | 7/2009 |
| JP | H06350514 A | 12/1994 |
| JP | 09501038 A | 1/1997 |
| JP | 09327060 A | 12/1997 |
| JP | H1118144 A | 1/1999 |
| JP | 2001231077 A | 8/2001 |
| JP | 2003506960 A | 2/2003 |
| JP | 2005277570 A | 10/2005 |
| JP | 2006345405 A | 12/2006 |
| JP | 2007529915 A | 10/2007 |
| JP | 2008017325 A | 1/2008 |
| JP | 2008500764 A | 1/2008 |
| JP | 2008500766 | 1/2008 |
| JP | 2008172357 A | 7/2008 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010516163 A | 5/2010 |
| JP | 2010519784 A | 6/2010 |
| JP | 2010536256 A | 11/2010 |
| JP | 2010541492 A | 12/2010 |
| JP | 2011505088 A | 2/2011 |
| JP | 2011505091 A | 2/2011 |
| JP | 2011507391 A | 3/2011 |
| JP | 2011516000 A | 5/2011 |
| JP | 2013502841 A | 1/2013 |
| KR | 20100018453 A | 2/2010 |
| RU | 2305902 C2 | 9/2007 |
| RU | 2007105748 | 8/2008 |
| WO | WO-0111804 A1 | 2/2001 |
| WO | WO-2004066104 | 8/2004 |
| WO | WO-2004079949 A1 | 9/2004 |
| WO | WO-2005019705 A1 | 3/2005 |
| WO | WO-2005062798 A2 | 7/2005 |
| WO | WO-2005071867 | 8/2005 |
| WO | WO2005109705 | 11/2005 |
| WO | 2005125053 A1 | 12/2005 |
| WO | WO-2006020021 A1 | 2/2006 |
| WO | WO-2006099546 A1 | 9/2006 |
| WO | WO-2007080892 A1 | 7/2007 |
| WO | WO2007097671 A1 | 8/2007 |
| WO | WO-2007097672 A1 | 8/2007 |
| WO | WO2007108630 A1 | 9/2007 |
| WO | 2007129620 A1 | 11/2007 |
| WO | WO-2007129537 A1 | 11/2007 |
| WO | WO-2008024751 A2 | 2/2008 |
| WO | 2008040448 A1 | 4/2008 |
| WO | 2008041819 A2 | 4/2008 |
| WO | 2008057969 | 5/2008 |
| WO | 2008081816 A1 | 7/2008 |
| WO | 2008086517 | 7/2008 |
| WO | 2008093985 A1 | 8/2008 |
| WO | WO-2008116128 A2 | 9/2008 |
| WO | 2009011059 A1 | 1/2009 |
| WO | WO2009016260 A1 | 2/2009 |
| WO | WO-2009020926 A1 | 2/2009 |
| WO | WO2009022295 | 2/2009 |
| WO | WO2009038367 | 3/2009 |
| WO | 2009043002 | 4/2009 |
| WO | 2009046061 A2 | 4/2009 |
| WO | WO-2009048246 A2 | 4/2009 |
| WO | 2009065075 A1 | 5/2009 |
| WO | WO2009062115 | 5/2009 |
| WO | WO2009064147 A2 | 5/2009 |
| WO | 2009071583 A1 | 6/2009 |
| WO | 2009076803 A1 | 6/2009 |
| WO | WO-2009067842 A1 | 6/2009 |
| WO | WO2009078795 A1 | 6/2009 |
| WO | 2009089798 A1 | 7/2009 |
| WO | WO2009088251 A2 | 7/2009 |
| WO | 2009096846 A1 | 8/2009 |
| WO | WO 2009/096846 A1 * | 8/2009 |
| WO | WO-2009126586 A2 | 10/2009 |
| WO | 2009152866 A1 | 12/2009 |
| WO | WO-2010006285 A2 | 1/2010 |
| WO | WO-2010016607 A1 | 2/2010 |
| WO | WO2010016726 A2 | 2/2010 |
| WO | 2010033957 A2 | 3/2010 |
| WO | WO-2010032791 A1 | 3/2010 |
| WO | WO-2010039738 | 4/2010 |
| WO | WO-2010044903 A2 | 4/2010 |
| WO | 2010110840 A2 | 9/2010 |
| WO | 2011034966 A1 | 3/2011 |

OTHER PUBLICATIONS

3GPP: "3rd Generation Partnership Project; Technical Specification Group Radio Access Network; Evolved Universal Terrestrial Radio

(56) References Cited

OTHER PUBLICATIONS

Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009, pp. 1-17, XP050377589.
3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, no. San Francisco, USA; 20090509, May 9, 2009, pp. 1-34, XP050339706, [retrieved on May 9, 2009].
3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0,, [Online] vol. 36.321, No. V8.5.0, Mar. 1, 2009, pp. 1-46, XP002555765 Internet Retrieved from the Internet: URL:http://www.3gpp.orq/ftp/Specs/html-inf 0/36321.htm> [retrieved on Oct. 21, 2009] Sections 5.1.1 to 5.1.6.
"3rd Generation Partnership Project; Technical Specification Group Radio Access Network; Evolved Universal Terrestrial Radio Access (E-UTRA) and Evolved Uni versal Terrestrial Radio Access Network (E-UTRAN); Overall description ; Stage 2 (Release 8)" 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.8.0, Mar. 1, 2009, pp. 1-157, XP050377583.
Ericsson: 3GPP Draft; R3-083577, 3rd Generation Partnership Project (3GPP), Mobile Competence Centre ; 650, Route Des Lucioles ; F-06921 Sophia-Antipolis Cedex ; France, no. Prague, Czech Republic; 20081125, Nov. 25, 2008, XP050324756 [retrieved on Nov. 25, 2008] Section 10.1.5.1.
Ericsson: "Simultaneous reception of transport channels in the LTE", 3GPP Draft; 36302_CR0009_(Rel-8) R2-093578, 3rd Generation Partnership Project (3GPP), Mobile Competence Centre ; 650, Route Des Lucioles ; F-06921 Sophia-Antipolis Cedex ; France, no. San Francisco, USA; 20090509, May 9, 2009, pp. 1-3, XP050340488, [retrieved on May 9, 2009].
Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351434 [retrieved on Aug. 18, 2009] p. 1, paragraph 1.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre ; 650, Route Des Lucioles ; F-06921 Sophia-Antipolis Cedex ; France, no. Prague, Czech Republic; 20080923, Sep. 23, 2008, XP050320136, [retrieved on Sep. 23, 2008] the whole document.
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351718 [retrieved on Aug. 18, 2009] p. 1, paragraph 1-paragraph 2.
Samsung: "Clarification on the parallel receptions for PDSCHs", 3GPP Draft; 36302_CR0010 (Rel-8) R2-093579, 3rd Generation Partnership Project (3GPP), Mobile Competence Centre ; 650, Route Des Lucioles ; F-06921 Sophia-Antipolis Cedex ; France, no. San Francisco, USA; 20090519, May 19, 2009, pp. 1-2, XP050340489, [retrieved on May 19, 2009].
Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, no. Shenzhen, China; 20090819, Aug. 19, 2009, XP050351683 [retrieved on Aug. 19, 2009] p. 1, paragraph 1.
Samsung: "Inbound mobility to H(e)NBs" 3GPP Draft; R2-093250_ Inbound Mobility to H(E)NBS-R4, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050340933 [retrieved on Apr. 28, 2009] the whole document.
Vice Chairman: "Report of E-UTRA control plane session" 3GPP Draft; R2-082841-Chair-Report-RAN2-62-LTE-CP, 3rd Generation Partnership Project (3GPP), Mobile Competence Centre ; 650, Route Des Lucioles ; F-06921 Sophia-Antipolis Cedex ; France, v o l . RAN WG2, no. Kansas City, USA; 20080514, May 14, 2008, XP050140403 [retrieved on May 14, 2008].
Young Jin Sang et al: "A Self-Organized Femtocell for IEEE 802.16e System", Global Telecommunications Conference, 2009. GLOBECOM 2009. IEEE, IEEE, Piscataway, NJ, USA, Nov. 30, 2009, pp. 1-5, XP031646102, ISBN: 978-1-4244-4148-8.
Qualcomm Incorporated, "RRM/RLM Resource Restriction for Time Domain ICIC", 3GPP TSG-RAN WG2 Meeting #72-bis, R2-110698, Dublin, Ireland, Jan. 17-21, 2011.
Qualcomm Incorporated, "Introduction of Time Domain ICIC", 3GPP TSG-RAN WG2 Meeting #72, R2-106943, Jacksonville, US, Nov. 15-19, 2010.
3GPP TS 36.331 V8.5.0, Radio Resource Control (RRC); Protocol specification (Release 8), 204 pages, 2009.
Ericsson: "Structure of System Information", TSGR2#4(99)414, 5 pages, May 1999.
Fujitsu, "An Efficient Reference Signal Design in LTE Advanced", 3GPP DRAFT; R1-090949, 3rd Generation Partnership Project (3GPP), Mobile Competence Centre, 650, Route des Lucioles, F-06921 Sophia-Antipolis Cedex, France, No. Athens, Greece, Feb. 6, 2009, XP050318788.
Gale et al., "Distributed discreate resource optimization in Heterogeneous networks". 2008, pp. 560-564, IEEE 04641670.
Garcia F., et al.,"Design of a slew rate controlled output buffer", ASIC Conference 1998. Proceedings. Eleventh Annual IEEE International Rochester, NY, USA Sep. 13-16, 1998, New York, NY, USA. IEEE, US, Sep. 13, 1998, pp. 147-150, XP010309693, DOI: 10.1109/ ASIC.1998.722821 ISBN: 978-0-7803-4980-3.
Huawei : "Enhanced ICIC for control channels to support Het.Net,", 3GPP TSG RAN WG1 meeting #61 R1-103126, May 14, 2010, pp. 1-8, XP002660456, Montreal, Canada Retrieved from the Internet: URL: http://ftp.3gpp.org/ftp/tsg-ran/WGI-RL 1/TSGR1_61/Docs/ [retrieved on Sep. 30, 2011].
Huawei: "CQI Enhancement for Interference Varying Environments", 3GPP DRAFT; R1-101061 CQI Enhancement for Interference Varying Environments VER (Final), 3rd Generation Partnership Project (3GPP), Mobile Competence Centre; 650, Route des Lucioles; F-06921 Sophia-Antipolis Cedex; France, vol. RAN WGI, No. San Francisco, USA; 20100222, Feb. 16, 2010, XP050418632, [retrieved on Feb. 16, 2010].
Huawei: "Enhanced ICIC and Resource-Specific CQI Measurement", 3GPP DRAFT; R1-101981, 3rd Generation Partnership Project (3GPP), Mobile Competence Centre; 650, Route des Lucioles; F-06921 Sophia-Antipolis Cedex; France, vol. RAN WGI, No. Beijing, china; 20100412, Apr. 6, 2010, XP050419318, [retrieved on Apr. 6, 2010].
Inoue et al., "Space time transmit site diversity for OFDM multi base station system", 2002, pp. 30-34, IEEE 01045691.
International Search Report and Written Opinion—PCT/US2011/ 032375—ISA/EPO—Jan. 25, 2012.
Panasonic: "PDCCH with cross component carrier assignment", 3GPP DRAFT; R1-093597 (Update of R1-093464), 3rd Generation Partnership Project (3GPP), Mobile Competence Centre; 650, Route des Lucioles; F-06921 Sophia-Antipolis Cedex; France, No. Shenzhen, China; Aug. 24, 2009, XP050388168, [retrieved on Aug. 22, 2009].
Qualcomm Europe: "Carrier Aggregation in Heterogeneous Networks", 3GPP DRAFT; R1-092239, 3rd Generation Partnership Project (3GPP), Mobile Competence Centre; 650, Route des

(56) References Cited

OTHER PUBLICATIONS

Lucioles; F-06921 Sophia-Antipolis Cedex; France, No. San Francisco, USA; May 8, 2009, XP050339658, [retrieved on May 8, 2009].
Qualcomm Incorporated: "Extending Rel-8/9 ICIC into Rel-10", 3GPP DRAFT; R1-101505 Extending Rel-8-9 ICIC into Rel-10, 3rd Generation Partnership Project (3GPP), Mobile Competence Centre; 650, Route des Lucioles; F-06921 Sophia-Antipolis Cedex; France, vol. RAN WG1, No. San Francisco, USA; 20100222, Feb. 16, 2010, XP050418951, [retrieved on Feb. 16, 2010].
Alcatel-Lucent Shanghai Bell et al., "Multi-cell cooperative RS in CoMP", 3GPP DRAFT; R1-092317, 3rd Generation Partnership Project (3GPP), Mobile Competence Centre; 650, Route des Lucioles; F-06921 Sophia-Antipolis Cedex; France, No. Los Angeles, USA; Jun. 24, 2009, XP050350848, [retrieved on Jun. 24, 2009].
European Search Report—EP13163886—Search Authority—Berlin—May 27, 2013.
Huawei: "Discussion on OTDOA based positioning issue", 3GPP DRAFT; R1-092355, 3rd Generation Partnership Project (3GPP), Mobile Competence Centre; 650, Route des Lucioles; F-06921 Sophia-Antipolis Cedex; France, No. Los Angeles, USA, Jun. 24, 2009, XP050350879, [retrieved on Jun. 24, 2009].
3GPP TS 36.355 V9.0.0, Technical Specification Group Adio Access Network, E-UTRA, "LTE Positioning Protocal (LLP) (Release 9)" Dec. 2009, 31 pages.
Taiwan Search Report—TW100112865—TIPO—Jan. 3, 2014.
3GPP: "LS on RV Determination for BCHH," 3GPP TSG RAN WG1 Meeting #54bis, Sep. 29, 2008, R1-084067, <URL:http://www.3gpp.org/ftp/tsg_ran/WG1_RL1.TSGR1_54b/Docs/R1-084067.zip>.
3GPP TSG-RAN WG2 Meeting #68 R096531, "Email discussion on MBMS value range [67b#14]", Nov. 9-13, 2009, Jeju, Korea, Discussion and Decision, <URL:http://www.3gpp.org/ftp/tsg_ran/WG2_RL2/TSGR2_68/Docs/R2-096531.zip>, pp. 1-13.
Alcatel-Lucent, "Interference Coordination Framework with Results", 3GPP TSG RAN WG1 Meeting #49bis, R1-07-3187, Jun. 29, 2007, pp. 1-9.
Catt, Addition of MBSFN information on X2 interface, [online], 3GPPTSG-RAN3 Meeting #64, May s, 2009, R3-091247, Internet<URL:http://www.3gpp.org/ftp/tsg_ran/WG3_64/Docs/R3-091247.zip>, pp. 1-14.
Huawei, "Consideration on CSI-RS design for CoMP and text proposal to 36.814", 3GPP TSG-RAN WG1#57b R1-092364, Los Angeles, USA, Jun. 29-Jul. 3, 2009.
LG Electronics: "Considerations on interference coordination in heterogeneous networks", 3GPP Draft; R1-101369, 3rd Generation Partnership Project (3GPP), Mobile Competence Centre; 650, Route des Lucioles; F-06921 Sophia-Antipolis Cedex; France, vol. RAN WGI, No. San Francisco, USA; 20100222-20100226, Feb. 16, 2010, XP050418854, pp. 1-5.
LG Electronics: "Coordinations for control channel in co-channel HeNB deployment", 3GPP Draft; R1-102429 Control Channel HETNET, 3rd Generation Partnership Project (3GPP), Mobile Competence Centre; 650, Route des Lucioles; F-06921 Sophia-Antipolis Cedex; France, vol. RAN WG1, No. Beijing, China; 20100412, Apr. 6, 2010, XP050419640, [retrieved on Apr. 6, 2010].
Motorola: "DCI Format 1C with implicit RV and TBS," 3GPP TSG-RAN1 WG4#5, Aug. 18, 2008, R1-083207, 5 pages, <URL:http://www.3gpp.org/ftp/tsg_ran/WG1_RL1/TSGR1_54/Docs/R1-083207.zip>.
NTT DOCOMO: "Downlink Interference Coordination Between eNodeB and Home eNodeB", 36PP Draft, R1-101225 HENB_ICIC, 3rd Generation Partnership Project (3GPP), Mobile Competence Centre, 650, Route des Lucioles, F-06921 Sophia-Antipolis Cedex; France, vol. RAN WGI, No. San Francisco, USA; 20100222, Feb. 16, 2010, XP050418740, [retrieved on Feb. 16, 2010], p. 1-8.
NTT DOCOMO: "Interference Coordination for Non-CA-based Heterogeneous Networks", 3GPP Draft, R1-102307 ICIC for non-CA HETNET, 3rd Generation Partnership Project (3GPP), Mobile Competence Centre, 650, Route des Lucioles, F-06921 Sophia-Antipolis Cedex; France, vol. RAN WG1, No. Beijing, china; 20100412, Apr. 7, 2010, XP050419698, [retrieved on Apr. 7, 2010].

NTT DOCOMO, "Performance Eveluations of Heterogeneous Networks", 3GPP TSG RAN WG1 Meeting #60, R1-101226, Feb. 26, 2010, pp. 1-18.
Qualcomm Europe: "Coordinated Multi-Point downlink transmission in LTE-Advanced" 3GPP Draft; R1-084400 Comp, 3rd Generation Partnership Project (3GPP), Mobile Competence Centre, 650, Route des Lucioles, F-06921 Sophia-Antipolis Cedex, France, No. Prague, Czech Republic, 20081105, Nov. 5, 2008, XP050317663.
Texas Imstruments: "Issues on Carrier Aggregation for Advanced E-UTRA", 3GPP Draft, R1-090280 TI Carrier Aggr, 3rd Generation Partnership Project (3GPP), Mobile Competence Centre, 650, Route des Lucioles, F-06921 Sophia-Antipolis Cedex, France, No. Ljubjana, 20090107, Jan. 7, 2009, XP050318205, pp. 1-5, [retrieved on Jan. 7, 2009].
Gaie C., et al., "Distributed Discrete Resource Optimization in Heterogeneous Networks," IEEE, 2008, pp. 560-564.
Interdigital Communications: "elCIC Macro-Femto: Time-domain muting and ABS", 3GPP TSG-RAN WG1#63, R1-105951, Nov. 15, 2010, 6 Pages, URL:http://www.3gpp.org/ftp/tsg_ran/WG1_RL1/TSGR1_63/Docs/R1-105951.zip.
Ericsson, Considerations on Non-CA based Heterogenous Deployments, 3GPP TSG-RAN WG1 #61, R1-102618, ST-Ericsson, 2010, 3 Pages.
LG Electronics, Coordination for DL Control Channel in Co-Channel CSG Deployment, 3GPP TSG RAN WG1 Meeting #61, R1-102704, 2010, 8 Pages.
3GPP TS 36.355 V9.0.0, LTE Positioning Protocol (LLP), 12.2009, http://www.3gpp.org/ftp/Specs/archive/36_series/36.355/36355-900.zip 3GPP TSG RAN WG2 #62bis, Ericsson, E-UTRA UE Radio Measurement Reporting for Uplink ICIC, R2-083147, 07.2008, http://3gpp.org/FTP/tsg_ran/WG2_RL2/TSGR2_62bis/Docs/R2-083147.zip.
LG-Nortel: "Interfernce under Type 1 RN", 3GPP TSG-RAN WG1#57, R1-092184, 14 pages, May 4, 2009.
Qualcomm Europe, "Carrier Aggregation in Heterogeneous Networks", 3GPP TSG RAN WG1 #56bis, R1-091459, pp. 1-12, Seoul, Korea, Mar. 23-27, 2009.
Huawei et al., "The possible restrictions on the coonfiguration of almost blank subframes in Macro-Pico deployments", 3GPP Draft; R1-105150 the Possible Restrictions on the Configuration of Almost Blank Subframes in Macro-Pi Co Deployments_VO 5, 3rd Generation Partnership Project (3GPP), Mobile Competence Centre; 650, Route des Lucioles: F-06921 Sophia-Antipolis CE, vol. RAN WG1, Oct. 5, 2010, XP050450368. pp 1-5.
Motorola: "HeNB Interference Management", 3GPP TSG-RAN WG1#60 R1-101121, <URL:http://www.3gpp.org/ftp/tsg_ran/WG1_RL1/TSGR1_60/Docs/R1-101121.zip>, Feb. 17, 2010, 4 Pages.
Nortel: "Discussions on ITE mobility performance evaluation", 3GPP TSG-RAN WG1#57 R1-091913, <URL:http://www.3gpp.org/ftp/tsg_ran/WG1_RL1/TSGR1_57/Docs/R1-091913.zip>, May 9, 2009, 3 Pages.
Qualcomm Incorporated: "Measurements and Feedback extenions for improved operations in HetNets", 3GPP TSG-RAN WG1#60b R1-102353, <URL:http://3gpp.org/ftp/tsg_ran/WG1_RL1/TSGR1_60b/Docs/R1-102353.zip>, Apr. 6, 2010, 3 Pages.
TSG-RAN WG4: "Reply to LS on mobility evaluation" 3GPP TSG-RAN WG4#50bis R4-091518, <URL:http://www.3gpp.org/ftp/tsg_ran/WG4_Radio/TSGR4_50bis/Documents/R4-091518.zip>, Mar. 30, 2009, 3 Pages.
ZTE: "Scenarios and Specification Impact of Type 2 Relay", 3GPP TSG-RAN WG1#60 R1-100979, <URL:http://www.3gpp.org/ftp/tsg_ran/WG1_RL1/TSGR1_60/Docs/R1-100979.zip>, Feb. 16, 2010, 7 pages.
Lopez-Perez D., et al., "OFDMA femtocells: A roadmap on interference avoidance", IEEE Communications Magazine, IEEE Service Center, Piscataway, US, vol. 47, No. 9, Sep. 1, 2009, pp. 41-48, XP011283364, ISSN:0163-6804, DOI:10.1109/MCOM.2009. 5277454.

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

HETEROGENEOUS NETWORK (HETNET) USER EQUIPMENT (UE) RADIO RESOURCE MANAGEMENT (RRM) MEASUREMENTS

CROSS-REFERENCE TO RELATED APPLICATIONS

This application claims benefit of U.S. Provisional Patent Application Ser. No. 61/323,858, filed Apr. 13, 2010, which is herein incorporated by reference.

BACKGROUND

I. Field

The present disclosure relates generally to communication, and more specifically to techniques for supporting communication in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure generally relate to performing radio resource management (RRM) measurements in a heterogeneous network (HetNet) in an effort to prevent failure of RRM measurement procedures with one cell in the presence of severe interference from another cell. Several alternatives are provided for determining particular resources (e.g., subframes) to use for performing the RRM measurements, wherein the particular resources are based on cooperative resource partitioning between cells of the HetNet, wherein the cells may be of different types (e.g., macro, pico, or femto cells). These alternatives include, for example: (1) intra-frequency or intra-RAT (radio access technology) alternatives, which may involve transmitting resource partitioning information (RPI) or deriving non-serving cell RPI based on the serving cell's RPI, as well as (2) inter-frequency or inter-RAT alternatives, where the RRM measurements may be performed during a measurement gap. In this manner, the UE may make radio resource measurements of signals received from one cell during certain subframes with limited interference from another cell.

Certain aspects of the present disclosure provide a method for wireless communications. The method generally includes receiving transmissions in subframes from cells, determining the subframes to include in a radio resource measurement based on resource partitioning information (RPI) for the cells, performing the radio resource measurement for the determined subframes, and reporting the measurement.

Certain aspects of the present disclosure provide an apparatus for wireless communications. The apparatus generally includes means for receiving transmissions in subframes from cells, means for determining the subframes to include in a radio resource measurement based on resource partitioning information (RPI) for the cells, means for performing the radio resource measurement for the determined subframes, and means for reporting the measurement.

Certain aspects of the present disclosure provide an apparatus for wireless communications. The apparatus generally includes a receiver configured to receive transmissions in subframes from cells and at least one processor. The at least one processor is configured to determine the subframes to include in a radio resource measurement based on resource partitioning information (RPI) for the cells, perform the radio resource measurement for the determined subframes, and report the measurement.

Certain aspects of the present disclosure provide a computer-program product for wireless communications. The computer-program product typically includes a computer-readable medium having code for receiving transmissions in subframes from cells, for determining the subframes to include in a radio resource measurement based on resource partitioning information (RPI) for the cells, for performing the radio resource measurement for the determined subframes, and for reporting the measurement.

Certain aspects of the present disclosure provide a method for wireless communications. The method generally includes determining, at a first base station, a measurement gap associated with a second base station for an inter-frequency or an inter-RAT (radio access technology) radio resource measurement; generating, at the first base station, resource partitioning information (RPI) with at least one subframe designated for radio resource measurements of the first base station; and transmitting subframes from the first base station according to the RPI, wherein the at least one subframe designated for radio resource measurements of the first base station falls within the measurement gap associated with the second base station.

Certain aspects of the present disclosure provide an apparatus for wireless communications. The apparatus generally includes means for determining a measurement gap associated with a base station for an inter-frequency or an inter-RAT (radio access technology) radio resource measurement; means for generating resource partitioning information (RPI) with at least one subframe designated for radio resource measurements of the apparatus; and means for transmitting subframes from the apparatus according to the RPI, wherein the at least one subframe designated for radio resource measurements of the apparatus falls within the measurement gap associated with the base station.

Certain aspects of the present disclosure provide an apparatus for wireless communications. The apparatus generally includes at least one processor and a transmitter. The at least one processor is typically configured to determine a measurement gap associated with a base station for an inter-frequency or an inter-RAT (radio access technology) radio resource measurement and to generate, resource partitioning information (RPI) with at least one subframe designated for radio resource measurements of the first base station. The transmitter is generally configured to transmit subframes from the apparatus according to the RPI, wherein the at least one subframe designated for radio resource measurements of the apparatus falls within the measurement gap associated with the base station.

Certain aspects of the present disclosure provide a computer-program product for wireless communications. The computer-program product typically includes a computer-readable medium having code for determining, at a first base station, a measurement gap associated with a second base station for an inter-frequency or an inter-RAT (radio access technology) radio resource measurement; for generating, at the first base station, resource partitioning information (RPI) with at least one subframe designated for radio resource measurements of the first base station; and for transmitting subframes from the first base station according to the RPI, wherein the at least one subframe designated for radio resource measurements of the first base station falls within the measurement gap associated with the second base station.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
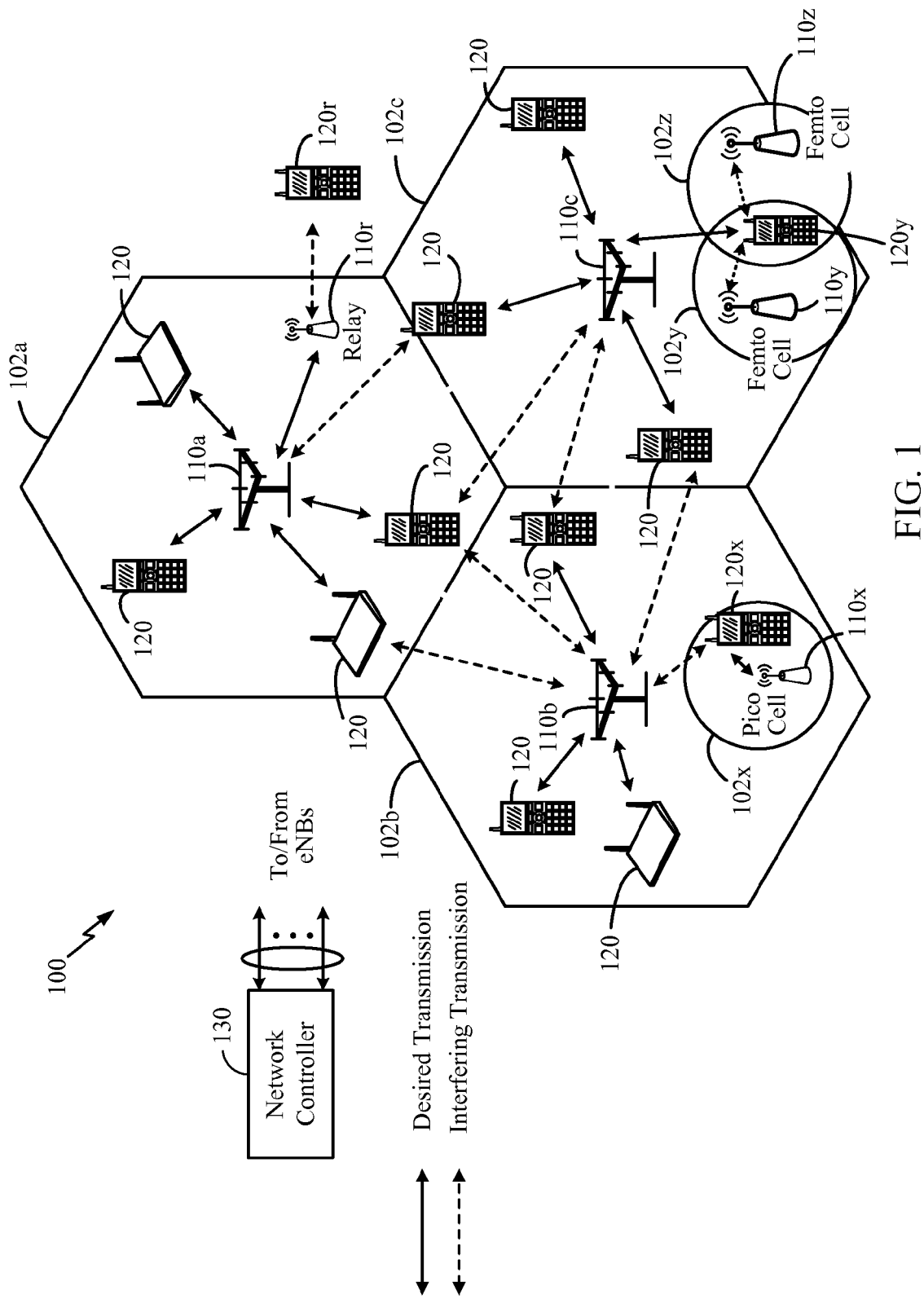
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
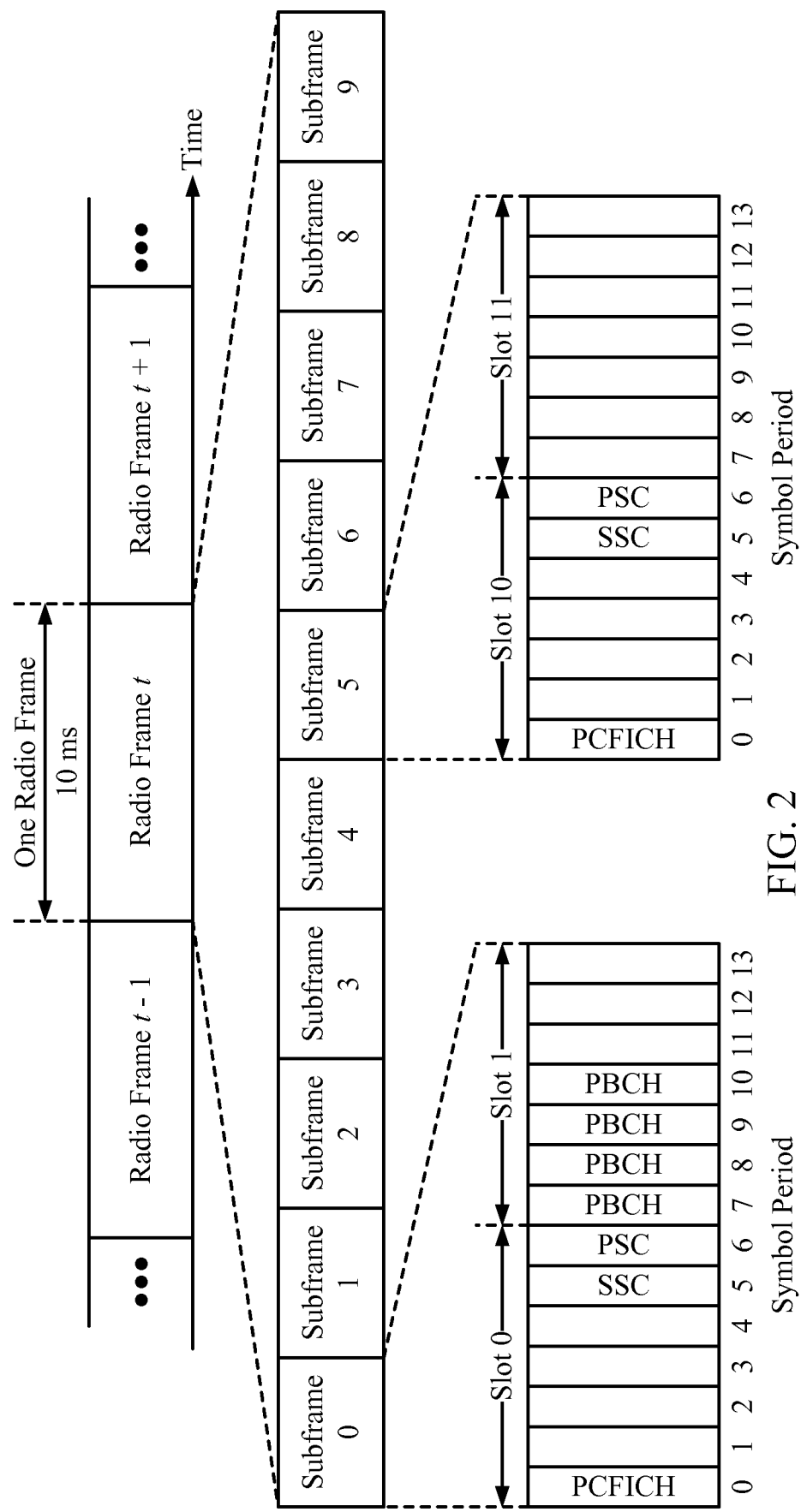
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
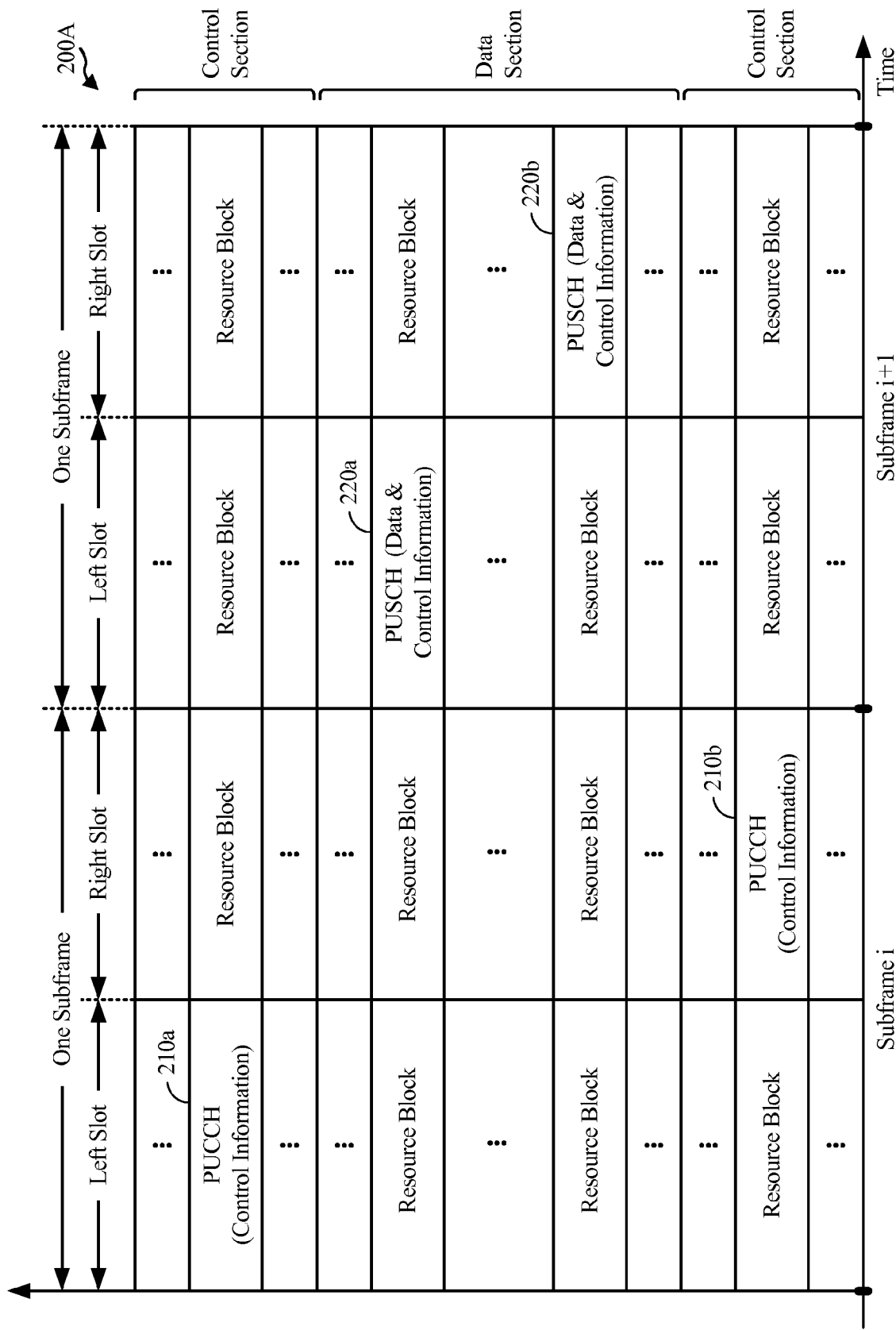
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210 on the assigned resource blocks in the control section. The UE may transmit only data or both data and control information in a Physical Uplink Shared Channel (PUSCH) 220 on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
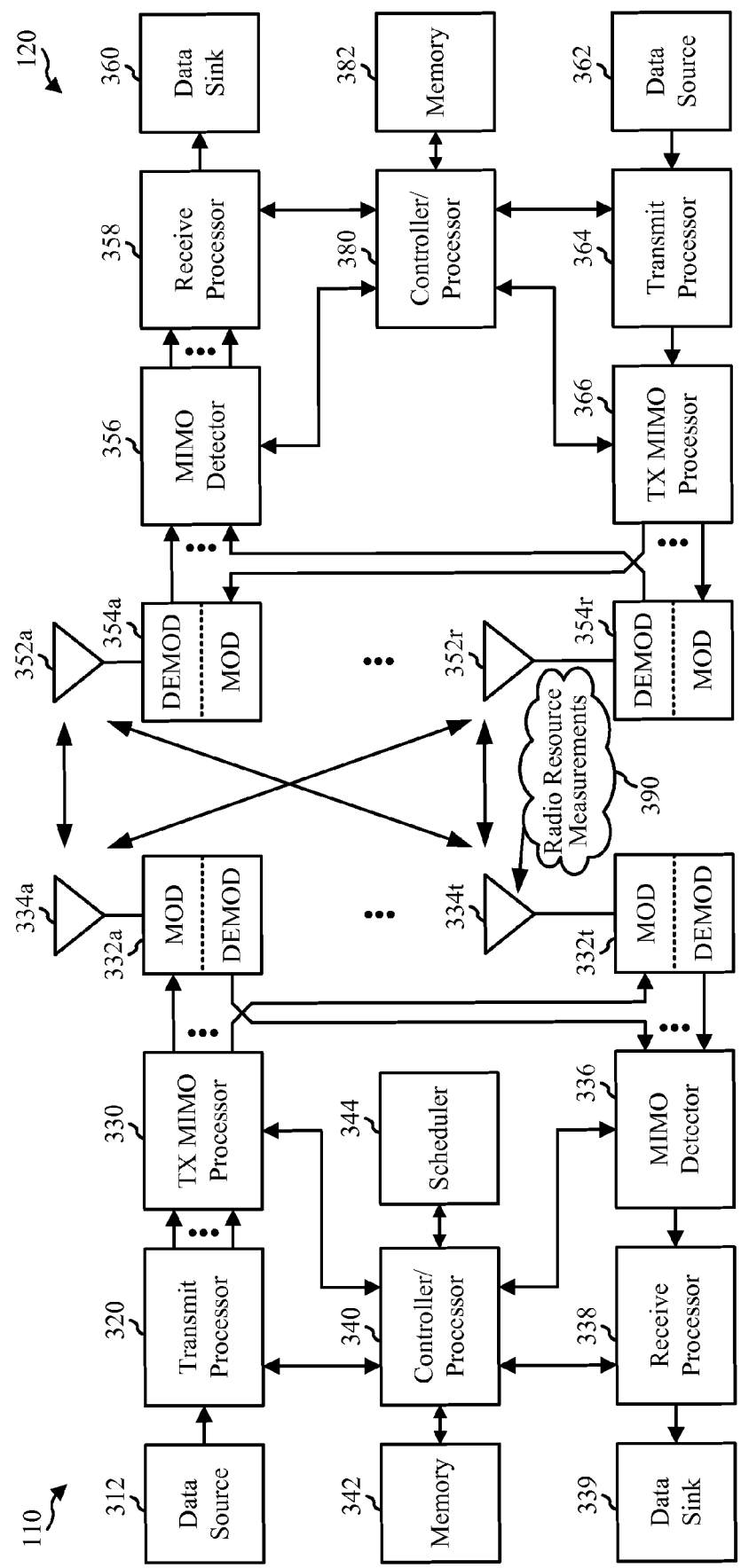
FIG. 3 is a block diagram conceptually illustrating an example of a Node B in communication with a user equipment (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from the modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 380 and/or other processors and modules at the UE 120 may perform or direct operations for blocks 800 in FIG. 8 and/or other processes for the techniques described herein. The controller/processor 340 and/or other processors and modules at the eNB 110 may perform or direct operations for blocks 900 in FIG. 9 and/or other processes for the techniques described herein. The memories 342, 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce/eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" for the macro cell. By negotiating for the femto cell to yield some of its resources, effectively removing interference, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the yielded resources (i.e., the coordinated resource partitioning) are frequency based, the interfering cell may yield subcarriers in the frequency domain. When the coordinated resource partitioning is a combination of both frequency and time, the interfering cell may yield certain frequency and time resources.

Figure 4:
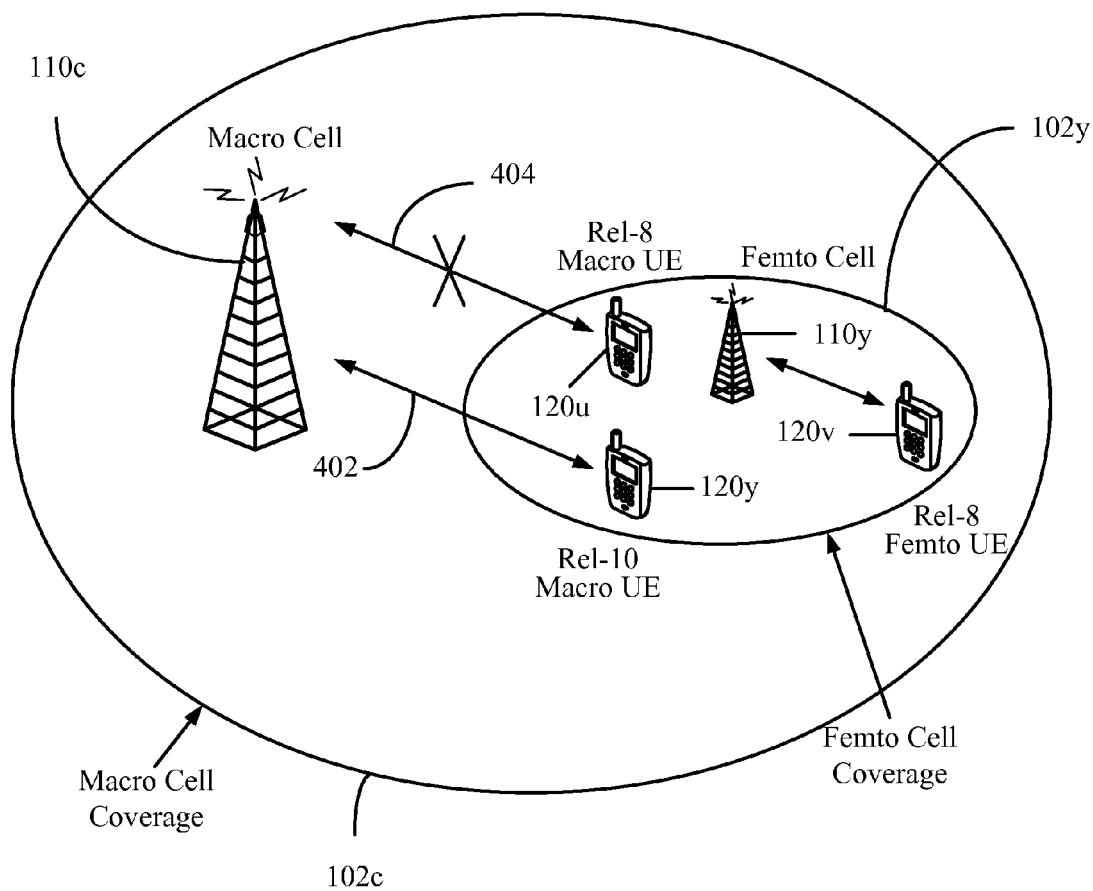
FIG. 4 illustrates an example heterogeneous network in accordance with certain aspects of the present disclosure.

FIG. 4 illustrates an example scenario where eICIC may allow a macro UE 120y supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, networks may support eICIC, where there may be different sets of partitioning information. A first of these sets may be referred to as Semi-Static Resource Partitioning information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$\text{Index}_{SRPI\_DL} = (SFN*10 + \text{subframe number}) \bmod 8$$

For the uplink, the SRPI mapping may be shifted, for example, by 4 ms. Thus, an example for the uplink may be:

$$\text{Index}_{SRPI\_UL} = (SFN*10 + \text{subframe number} + 4) \bmod 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe);
N (No Use): this value indicates the subframe shall not be used;
X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g., macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically known only to the base stations, and a UE does not know it.

Figure 6:
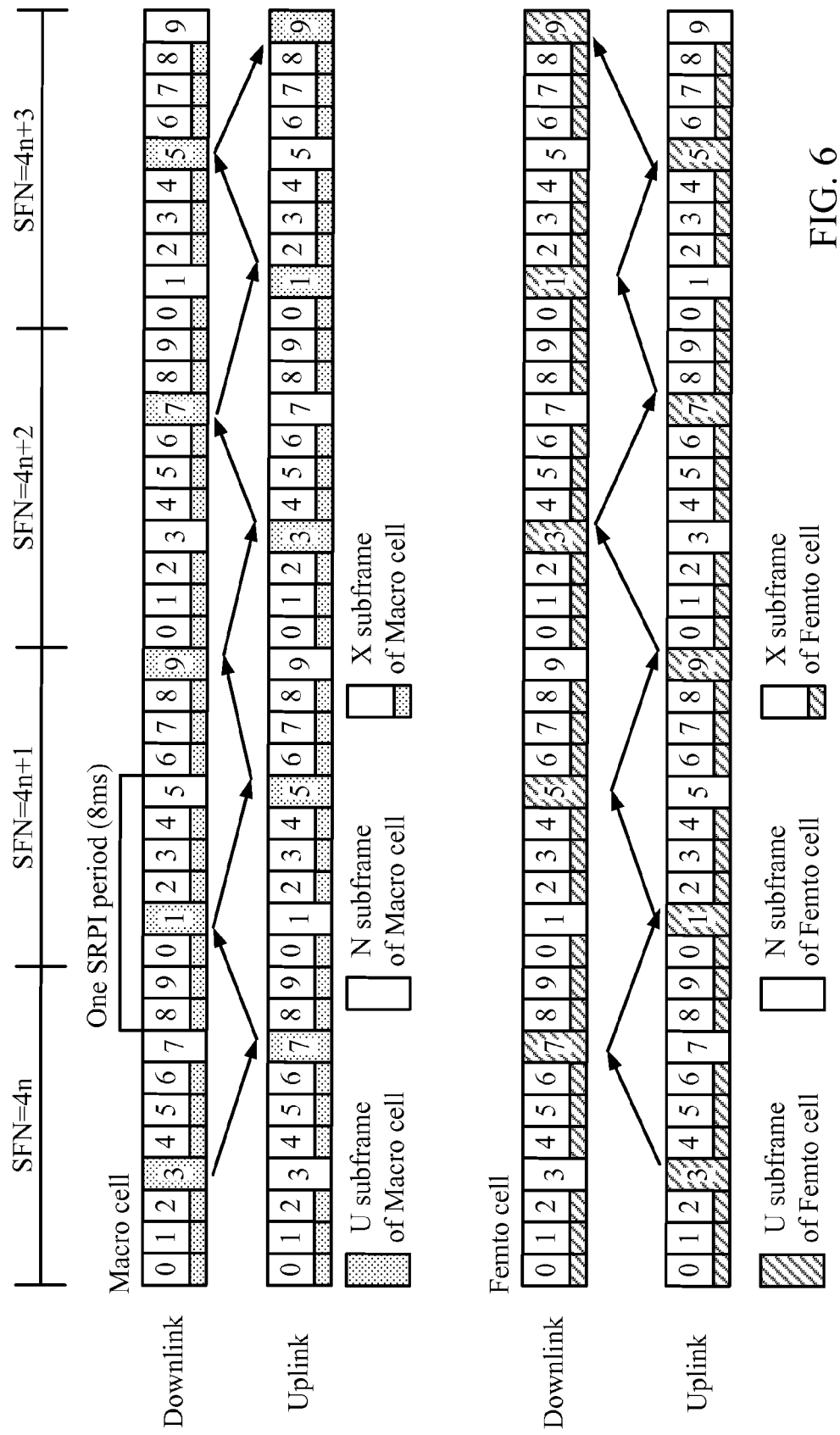
FIG. 6 illustrates example cooperative partitioning of subframes in a heterogeneous network in accordance with certain aspects of the present disclosure.

FIGS. 5 and 6 illustrate examples of SRPI assignment as described above in the scenario with macro and femto cells.

Example HetNet UE RRM Measurements

A U subframe is a subframe that may be clean of dominant interference. U subframe information may be delivered to a UE. Radio resource management (RRM) measurements may be made over only U subframes due to removed data interference. RRM measurements may comprise a reference signal received power (RSRP) and a reference signal received quality (RSRQ). The RSRP may indicate received power on a cell-dedicated reference signal (CRS), and the RSRQ may indicate received quality on the CRS. The RSRQ may be calculated as follows:

$$RSRQ = N \cdot RSRP/RSSI$$

where RSSI is the received signal strength indicator. The RSSI may dramatically change on different subframes, due to resource partitioning. The CRS may be transmitted in all non-multimedia broadcast over a single frequency network (MBSFN) subframes; therefore, there may be no need to know the interlace. Interference coordination of a colliding CRS may further improve the performance. The RSRQ may be redefined for an LTE Release 10 (Rel-10) UE:

$$RSRQ = N \cdot RSRP/(RSSI_{U\_subframes} - RSRP_{orthogonalized\_interfering\_cell})$$

This may indicate the true performance of a U subframe.

RRM measurements from a serving/camping cell may be made since resource partitioning information (RPI) may be made available from the serving cell. Therefore, which subframes to measure (i.e., U subframes) may be determined based on the RPI. RPI may not be known for a non-serving/camping cell. Certain aspects of the present disclosure disclose methods for determining which subframes to include in a radio resource measurement based on an RPI for the cells. Certain aspects discussed herein may apply to connected mode or idle mode, inter-frequency designs or intra-frequency designs, and serving cells or neighbor cells.

For certain aspects, a neighbor list from a serving cell may carry the non-serving cell RPI in a system information block (SIB). This aspect may apply in a macro-pico case, where the number of pico cells may be limited (i.e., physical cell identity (PCI)-to-RPI mapping). CSG cells (e.g., femto cells) may be allocated one or two patterns, but there may be no explicit PCI-to-RPI mapping. For certain aspects, the RPI may be the same for the same types of cells (e.g., macro, pico, or femto).

For certain aspects, a UE may derive a non-serving cell's RPI based on a serving cell's RPI. For certain aspects, the RPI of a serving cell and a non-serving cell may be the same, so the UE may consider the RPI for the non-serving cell to be the same as the RPI for the serving cell as part of deriving the non-serving cell's RPI. In other words, a UE may use the U subframe of the serving cell for non-serving cell measurements. For certain aspects, the RPI of the non-serving cell may compliment the RPI of the serving cell. In other words, a UE may use the N subframe of the serving cell for non-serving cell measurements (e.g., the non-serving cell may be a different class from the serving cell). For certain aspects, the UE may combine multiple measurements over U and N subframes for final reporting (e.g., reporting multiple RSRQ and RSRP—one from a U subframe and another from an N subframe). The best RSRQ from these multiple measurements may be selected.

For certain aspects, a UE may perform blind detection based on performing RRM measurements over all subframes. The UE may be able to detect patterns by determining which subframes the UE may be able to make good and bad measurements from, wherein the partitioning patterns may further allow the UE to determine the subframes (e.g., U subframes) to include in an RRM measurement.

For certain aspects, a UE may determine which subframes to measure by reading a system information block type 1 (SIB1) from an aggressor (e.g., a neighbor cell). This aspect may apply in a femto cell scenario, where a UE may read a SIB1 of a CSG to determine whether the UE may subscribe. A UE camped on a macro cell may power up under a CSG, wherein the UE may read from the CSG SIB1 to determine the N subframe (i.e., the macro cell RPI assuming complimentary RPI from the femto cell).

For certain aspects, the RPI for a non-serving cell may be carried in a master information block (MIB), which may allow a faster measurement procedure. For certain aspects, four configurations may use 2 bits in the MIB, wherein the RPI pattern may be based on the type of cell.

For certain aspects, additional PCI partitioning for pico cells may be introduced, wherein the additional partitioning may be hard coded to PCI-to-RPI spaces. The PCI space partitioning may be broadcasted using a synchronization channel.

For inter-frequency or inter-radio access technology (RAT) design, if cross-layer synchronization and RPI is available, a neighbor list from a serving cell may carry the non-serving cell RPI, as in certain aspects described above. Used for measuring cells for inter-frequency or inter-RAT handover, the current measurement gap (6 ms in LTE), however, may not be compatible with interlace-based semi-static partitioning (i.e., RPI). The 6 ms gap with a 40 ms periodicity may permanently miss the U interlace. The 6 ms gap may not capture the physical broadcast channel (PBCH); therefore, there may be no system frame number (SFN) information. Cross frequency RPI may not be available or possible for asynchronous networks.

For certain aspects, the measurement gap may be increased by a factor of two to about 11 ms (contiguous) plus the MIB payload. For certain aspects, the measurement gap lasts at least 10 ms. This may be sufficient to capture the MIB in each measurement gap. Further, at least one U interlace may be captured during each measurement gap. For certain aspects, the RPI may be carried in the MIB.

For certain aspects, the measurement gap may be shifted, and there may be autonomous system information (SI) reading. First, the UE may measure the PCI and report to the serving cell. The serving cell may request the UE to perform an autonomous SI reading (i.e., MIB or SIB). The UE may read the strongest cell first, then "bootstrap" the process to measure other cells. More specifically, a UE may read the MIB or SIB of the strongest cell(s) to find out the RPI of weaker cells. Then the UE acquires and measures the weak cells based on information (including the RPI) acquired from the strongest cell(s). In this manner, the UE may bootstrap, i.e, derive or determine a likely schedule for measuring the weaker cells, using the information from the strongest cell(s). Without using the information from the strongest cell(s), the UE would likely not be able to measure the weak cells straightaway. A UE may also directly read the SIB of weak cells if sufficient information is provided in the MIB. The base station (e.g., an eNB) may decide whether to perform SI reading or not based on deployment knowledge (e.g., neighbor, band, UE subscription, location, etc). The UE may use a longer measurement gap for SI reading and generate SFN and RPI information for all cells of interest. The UE may report this information and request the measurement gap to be shifted to coincide with the U subframe of some cells. The base station may configure the UE on shifted 6 ms gaps. For certain aspects, multiple gaps may be utilized to capture all cells since U subframes may be disjoint.

For certain aspects, the U subframes may be restricted to at least two interlaces per 8 ms resource partitioning period (e.g., at least one U subframe every 4 ms, or at least two U subframes every 8 ms). This may ensure at least one good measurement (i.e., a measurement with reduced/eliminated interference) in each 6 ms measurement gap. The UE may select the best RSRQ to report. However, there may be a loss of granularity in this case.

Figure 7:
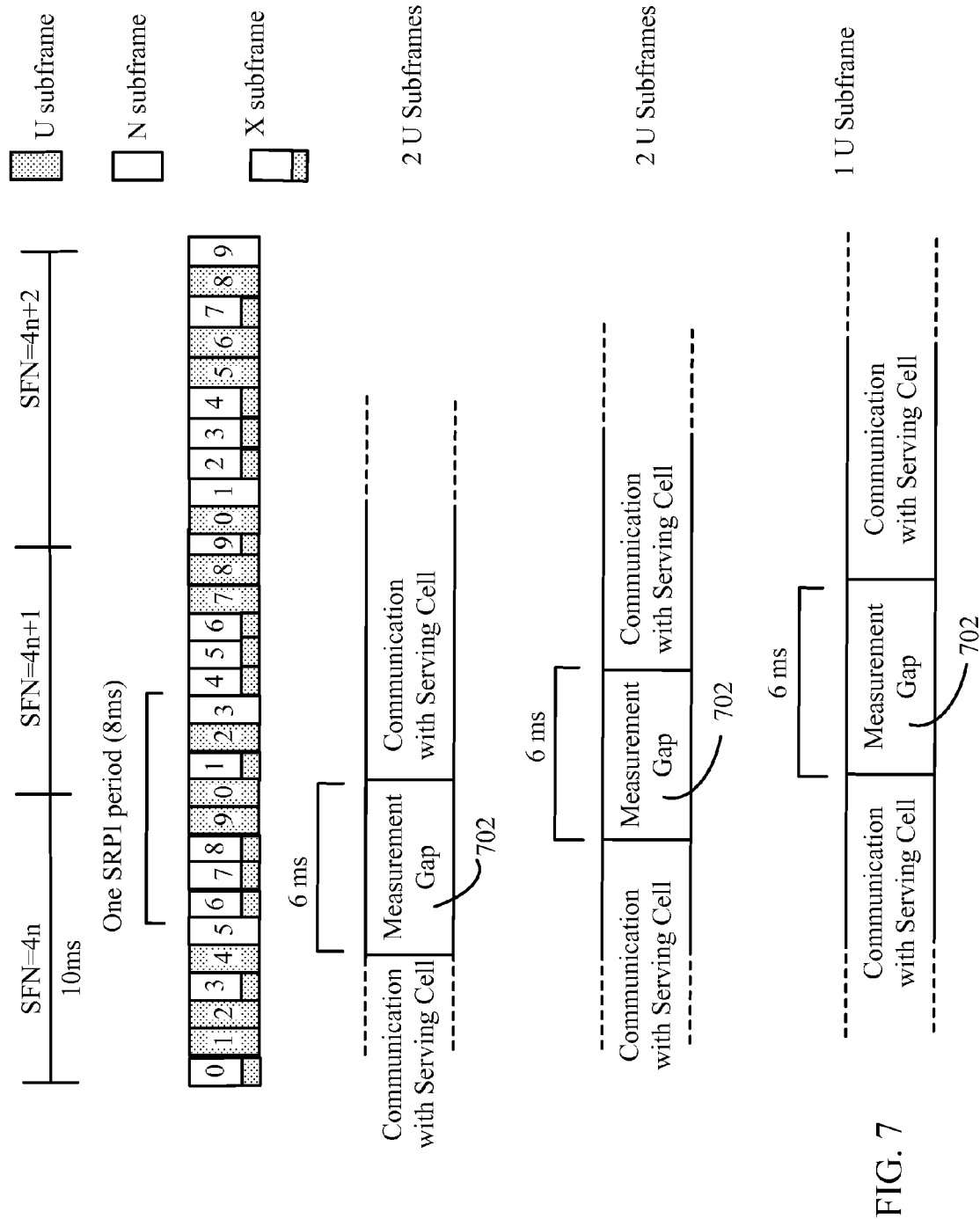
FIG. 7 illustrates example cooperative partitioning of subframes with three use (U) subframes and various measurement gaps for making inter-frequency or inter-RAT (radio access technology) measurements, in accordance with certain aspects of the present disclosure.

For example, FIG. 7 illustrates example resource partitioning with three U subframes (i.e., greater than 2 U subframes) in every 8 ms SRPI period. In this manner, no matter where the measurement gap 702 occurs for making inter-frequency or inter-RAT measurements, there will be at least one good measurement (i.e., a measurement made in a U subframe without severe interference) in the measurement gap. During a measurement gap 702, communication with the serving cell is temporarily suspended as shown, such that a UE may measure other, non-serving cells for inter-frequency or inter-RAT handover. Furthermore, the serving cell does not communicate with the UE during the measurement gap 702.

For certain aspects, a UE may be configured to use an autonomous measurement gap for measurements. As used herein, an autonomous measurement gap generally refers to a measurement gap requested by the UE and granted by the E-UTRAN. An autonomous measurement gap may be allocated by an eNB only during certain periods in an effort to avoid affecting the data transmission rate and throughput of the UE, such as a period in which the channel quality of the serving cell is low or in a period in which the UE is less likely to be scheduled for data transmission. The UE may be limited by the total latency and total number of subframe drops. However, the UE may use longer gaps to capture some U subframes.

Figure 8:
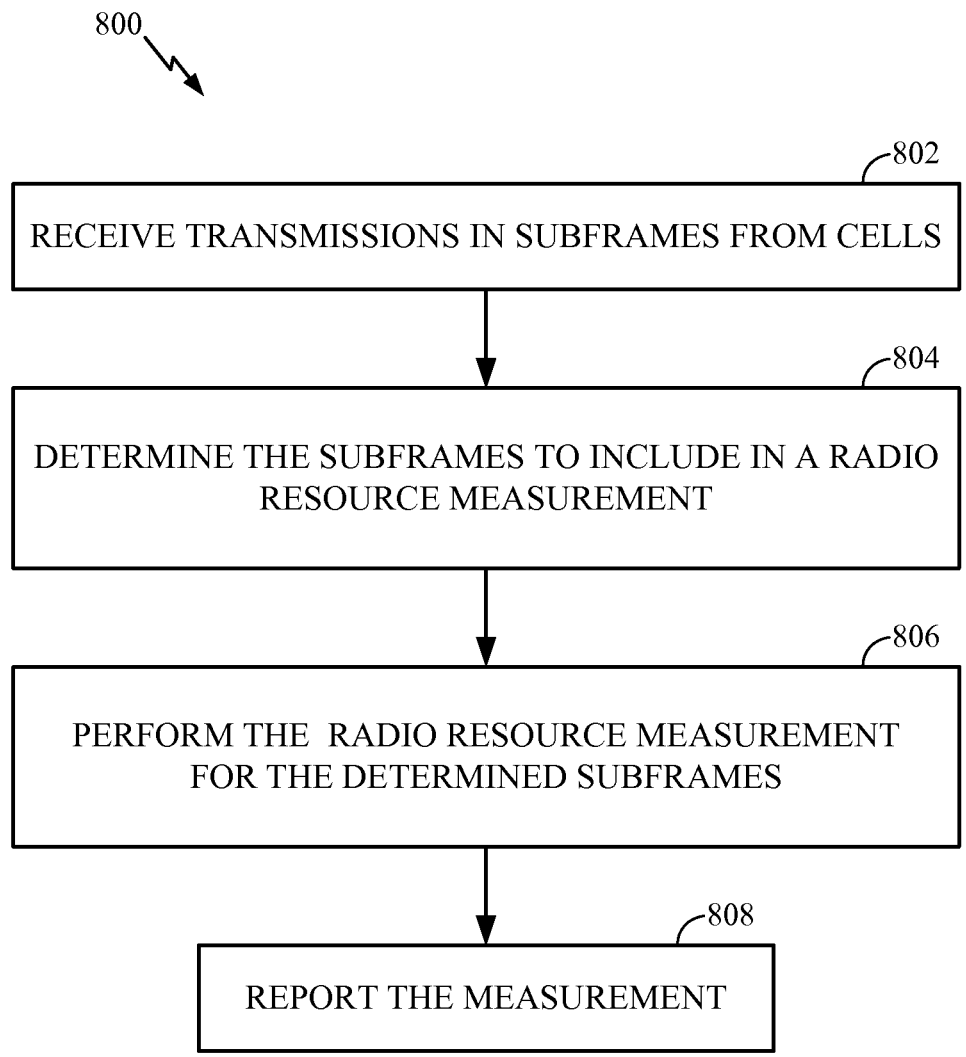
FIG. 8 is a functional block diagram conceptually illustrating example blocks executed to perform radio resource measurement for determined subframes, in accordance with certain aspects of the present disclosure.

FIG. 8 is a functional block diagram conceptually illustrating example blocks 800 executed to perform a radio resource measurement for subframes, in accordance with certain aspects of the present disclosure. The blocks 800 may be performed, for example, by a UE 120. At block 802, the UE may receive transmissions in subframes from cells (e.g., a serving cell and/or one or more non-serving cells).

At block 804, the UE may determine the subframes to include in a radio resource measurement. The determination is made based on resource partitioning information (RPI) for the cells. For example, measurement may be limited to only protected subframes (i.e., clean subframes, such as U subframes). For certain aspects, the RPI may be determined based on RPI received from the serving cell for both the serving cell and one or more non-serving cells. For other aspects, the RPI for the non-serving cells may be derived from RPI received from the serving for only the serving cell. For still other aspects, the RPI may be determined based on RPI received from one or more non-serving cells for the non-serving cells themselves.

At block 806, the UE may perform the radio resource measurement for the determined subframes. The radio resource measurement may comprise an RRM measurement. For certain aspects, the radio resource measurement may comprise an inter-frequency or an inter-RAT radio resource measurement. For such aspects, the inter-frequency/inter-RAT radio resource measurement may be performed during a measurement gap having a duration longer than the conventional 6 ms, such as at least 10 ms. Alternatively, the inter-frequency/inter-RAT radio resource measurement may be performed during multiple measurement gaps (e.g., where each measurement gap has a duration of about 6 ms).

At block 808, the UE may report the measurement for certain aspects. This reporting typically involves transmitting an indication of the radio resource measurement result to the serving base station. The reporting may only be done when performing connected-mode RRM measurement. Idle-mode RRM measurement is used for cell reselection (i.e., determining the best cell to associate with for network service).

Figure 8A:
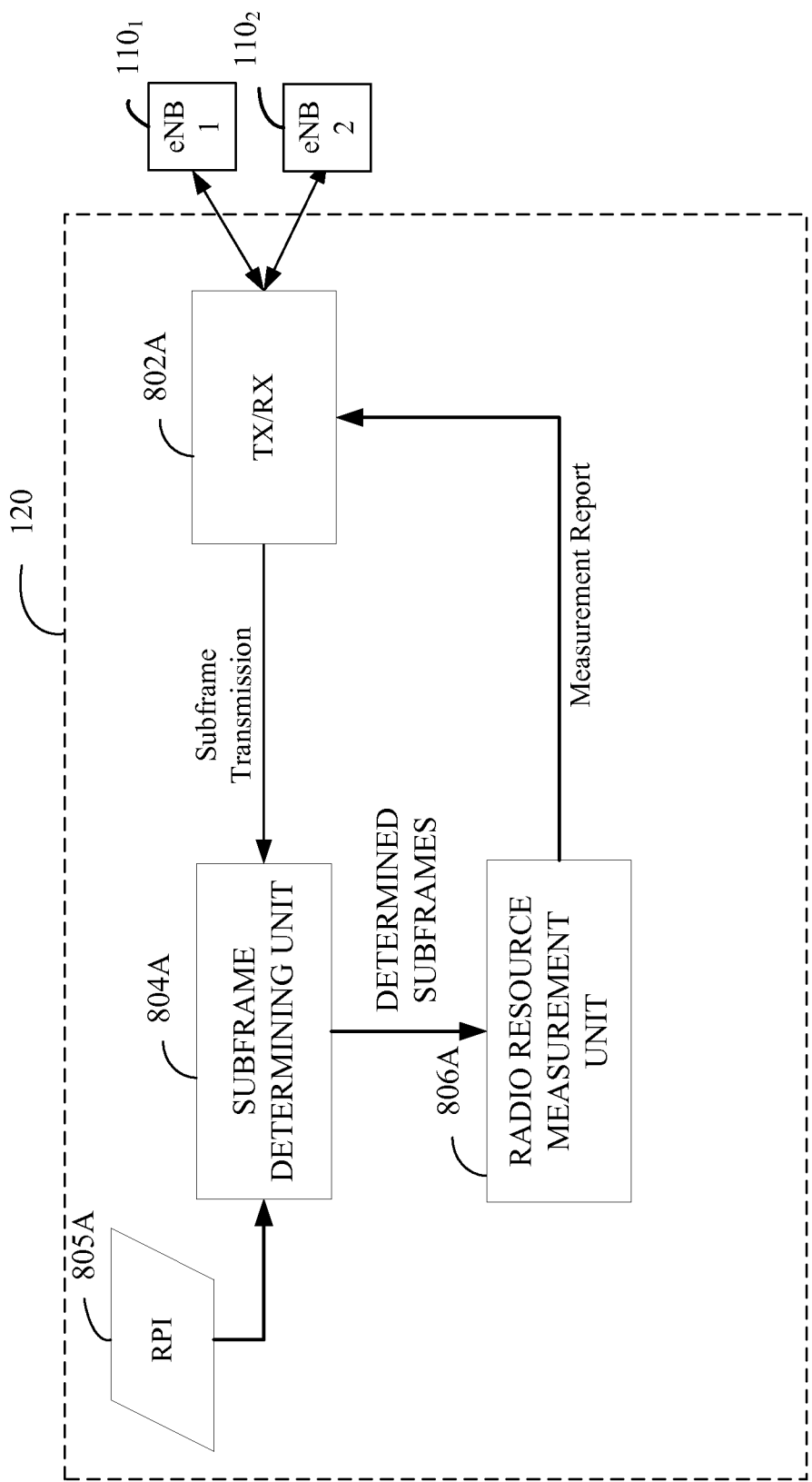
FIG. 8A illustrates example components capable of performing the operations illustrated in FIG. 8.

The operations described above may be performed by any suitable components or other means capable of performing the corresponding functions of FIG. 8. For example, blocks 800 illustrated in FIG. 8 correspond to components 800A illustrated in FIG. 8A. In FIG. 8A, a transceiver 802A may receive transmissions in subframes from one or more cells, such as $eNB_1$ and $eNB_2$. A subframe determining unit 804A may determine the subframes to include in a radio resource measurement based on RPI 805 for the cells. The RPI 805 may be determined from the received subframes. A radio resource measurement unit 806A may perform the radio resource measurement for the subframes as determined by the subframe determining unit 804A. The radio resource measurement unit may then report the radio resource measurement via the transceiver 802A.

Figure 9:
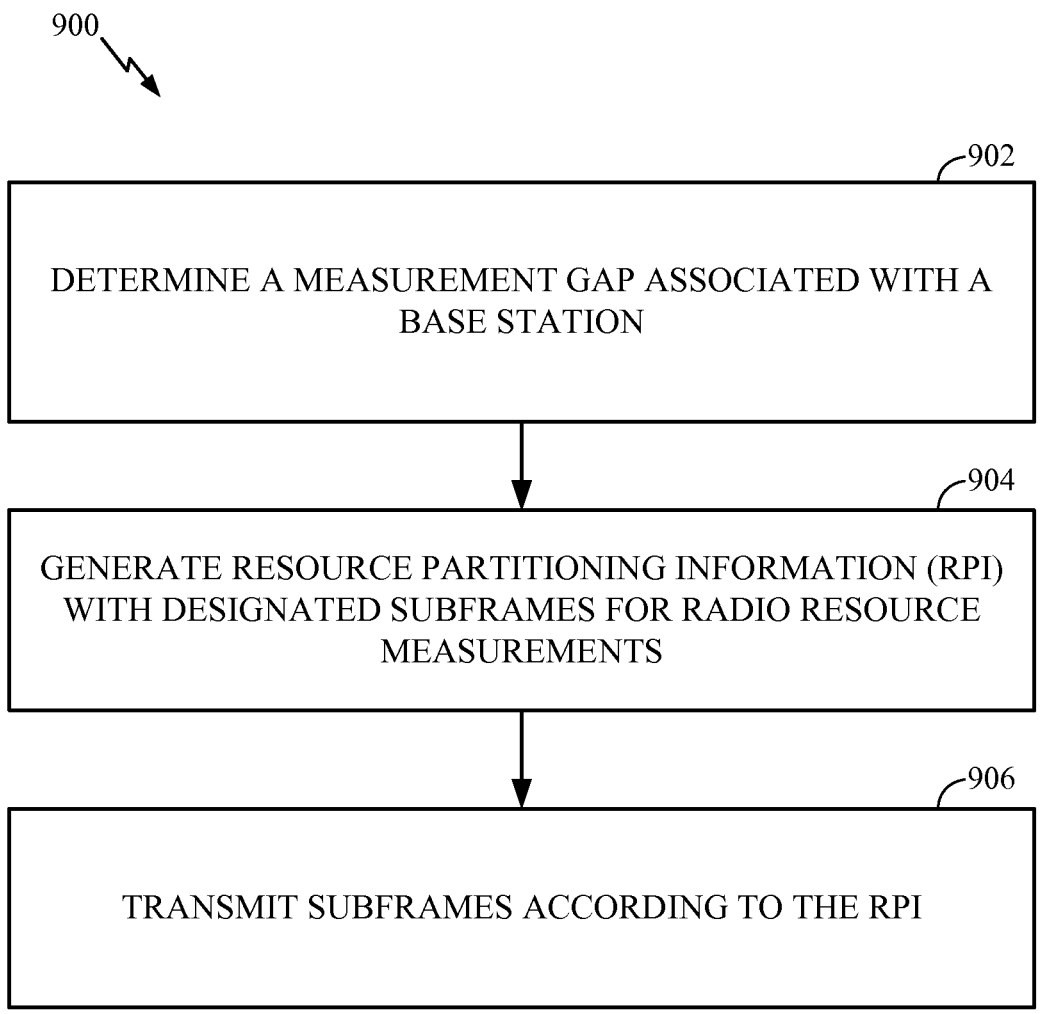
FIG. 9 is a functional block diagram conceptually illustrating example blocks executed to generate resource partitioning information (RPI) at a first base station such that at least one subframe designated for radio resource measurement falls within a measurement gap associated with the second base station, in accordance with certain aspects of the present disclosure.

FIG. 9 is a functional block diagram conceptually illustrating example blocks 900 executed to generate RPI at a first base station such that at least one subframe designated for radio resource measurement falls within a measurement gap associated with the second base station. The blocks 900 may be performed, for example, by an eNB 110 as the first base station, and the second base station may also be an eNB 110, typically operating with a different frequency or using a different radio access technology (RAT). The first and second base stations may also be different types.

At block 902, a first base station may determine a measurement gap associated with a second base station for an inter-frequency or an inter-RAT radio resource measurement. For certain aspects, determining a measurement gap comprises receiving an indication of the measurement gap via a backhaul between the first and second base stations.

At block 904, the first base station may generate RPI with at least one subframe designated for radio resource measurements of the first base station. The first base station may generate the RPI by determining certain time and/or frequency resources to use for communicating with one or more UEs served by the first base station. The RPI is generated such that at least one subframe designated for radio resource measurements associated with the first base station falls within the measurement gap associated with the second base station, as described above. For certain aspects, the first base station may negotiate the RPI with one or more other stations via the backhaul, for example. For other aspects, the first base station may derive the RPI to use based on the RPI of another neighbor base station received via the backhaul, for example.

At block 906, the first base station may transmit subframes according to the generated RPI. These subframes include the at least one subframe designated for radio resource measurements associated with the first base station that falls within the measurement gap associated with the second base station.

For certain aspects, the first base station uses a different RAT than the second base station. For certain aspects, the first base station uses a different frequency than the second base station. For certain aspects, the at least one subframe comprises more than two subframes. For certain aspects, an indication of the measurement gap may be received by the first base station via a backhaul between the first and second base stations.

Figure 9A:
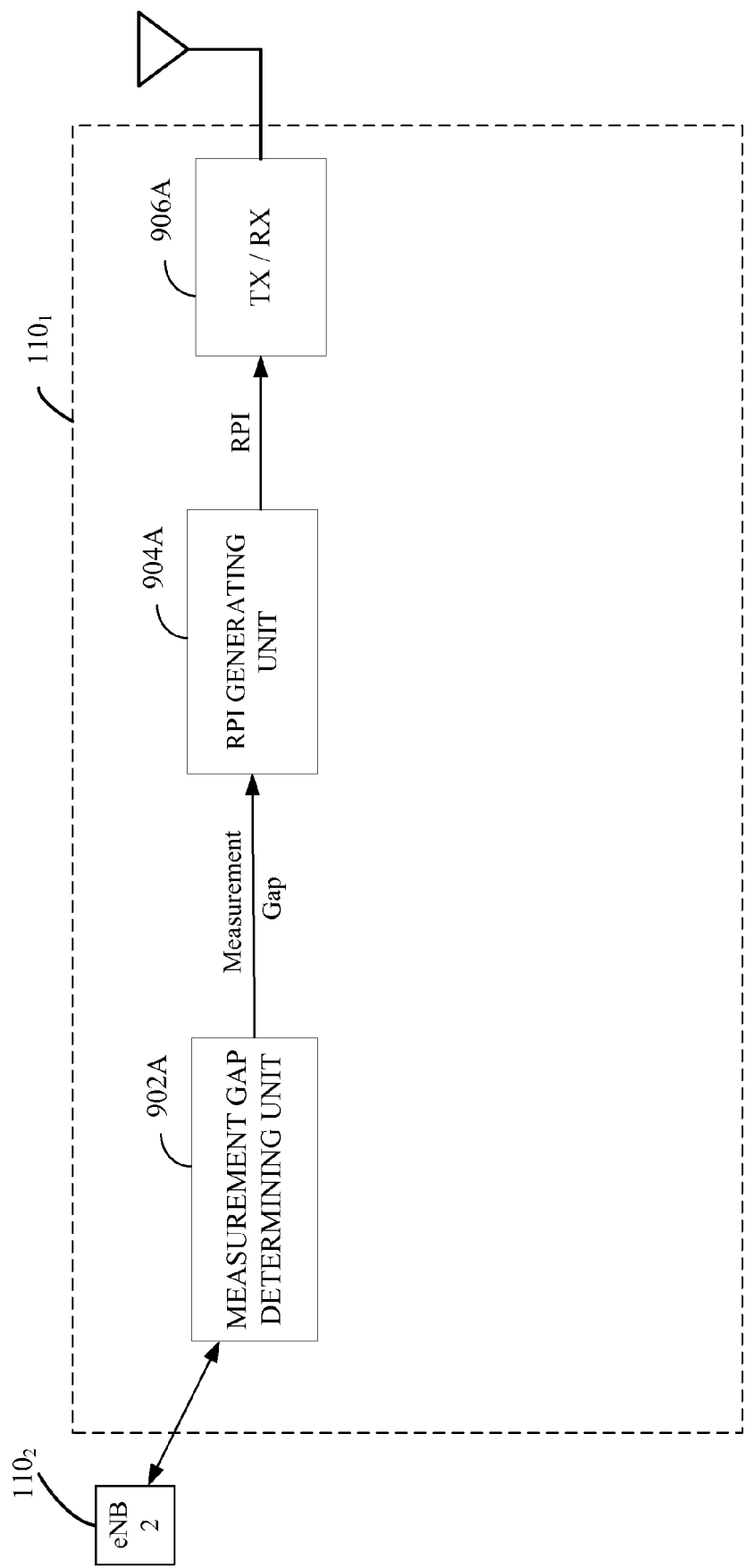
FIG. 9A illustrates example components capable of performing the operations illustrated in FIG. 9.

The operations described above may be performed by any suitable components or other means capable of performing the corresponding functions of FIG. 9. For example, blocks 900 illustrated in FIG. 9 correspond to components 900A illustrated in FIG. 9A. In FIG. 9A, a measurement gap determining unit 902A in a first eNB 110 may determine a measurement gap associated with a second eNB 110. An RPI generating unit 904A may generate RPI with subframes designated for radio resource measurements such that the designated subframes fall within the measurement gap. A transceiver 906A may transmit subframes according to the RPI from the RPI generating unit 904A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for performing, means for reporting, and/or means for generating may comprise a processing system, which may include at least one processor, such as the transmit processor 320 or the controller/processor 340 of the eNB 110 or the receive processor 358 or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications at a user equipment (UE), comprising:
   receiving transmissions, at the UE, from a plurality of cells, the transmissions occurring during a plurality of subframes, and the plurality of cells including a serving cell and one or more non-serving cells;
   determining a set of subframes, from the plurality of subframes, to include in a radio resource measurement, the set of subframes being based on resource partitioning information (RPI), the RPI being associated with the plurality of cells, the set of subframes including at least one protected subframe associated with the serving cell, the at least one protected subframe being at least one subframe in which the one or more non-serving cells refrain from transmitting during at least a portion of the at least one protected subframe; and performing the radio resource measurement during the determined set of subframes.

2. The method of claim 1, further comprising reporting the measurement.

3. The method of claim 1, wherein the determining comprises receiving, from the serving cell, the RPI for both the serving cell and the one or more non-serving cells.

4. The method of claim 3, wherein a neighbor list from the serving cell carries the RPI in a system information block (SIB).

5. The method of claim 1, wherein the determining comprises:
receiving, from the serving cell, RPI for the serving cell; and
deriving RPI for the one or more non-serving cells based on the RPI for the serving cell.

6. The method of claim 5, wherein the deriving comprises considering the RPI for the one or more non-serving cells to be the same as the RPI for the serving cell.

7. The method of claim 5, wherein the deriving comprises performing blind detection based on performing the radio resource measurement for the received subframes.

8. The method of claim 1, wherein the determining comprises receiving, from the one or more non-serving cells, RPI for the one or more non-serving cells.

9. The method of claim 8, wherein receiving the RPI for the one or more non-serving cells comprises reading a system information block type 1 (SIB1) from the one or more non-serving cells.

10. The method of claim 8, wherein the RPI for the one or more non-serving cells is carried in a master information block (MIB).

11. The method of claim 1, wherein the radio resource measurement is a measurement of reference signal receive quality (RSRQ) based on a received signal strength indicator (RSSI) in the determined set of subframes and on a reference signal receive power (RSRP) of an interfering cell from among the one or more non-serving cells.

12. The method of claim 1, wherein the radio resource measurement comprises an intra-frequency radio resource measurement associated with the serving cell or the one or more non-serving cells.

13. The method of claim 1, wherein the radio resource measurement comprises an inter-frequency or an inter-RAT (radio access technology) radio resource measurement associated with the one or more non-serving cells.

14. The method of claim 13, wherein the performing comprises performing the inter-frequency or the inter-RAT radio resource measurement for the determined set of subframes during a measurement gap longer than 6 ms.

15. The method of claim 14, wherein the measurement gap lasts at least 10 ms.

16. The method of claim 13, wherein the performing comprises performing the inter-frequency or the inter-RAT radio resource measurement for the determined set of subframes during multiple measurement gaps.

17. The method of claim 13, further comprising sending a request to shift a measurement gap for the inter-frequency or the inter-RAT radio resource measurement to coincide with the determined set of subframes.

18. The method of claim 17, wherein the request to shift is based on the RPI of the cells.

19. An apparatus for wireless communications, comprising:
means for receiving transmissions, at a user equipment, from a plurality of cells, the transmissions occurring during a plurality of subframes, and the plurality of cells including a serving cell and one or more non-serving cells;
means for determining a set of subframes, from the plurality of subframes, to include in a radio resource measurement, the set of subframes being based on resource partitioning information (RPI), the RPI being associated with the plurality of cells, the set of subframes including at least one protected subframe associated with the serving cell, the at least one protected subframe being at least one subframe in which the one or more non-serving cells refrain from transmitting during at least a portion of the at least one protected subframes; and
means for performing the radio resource measurement during the determined set of subframes.

20. The apparatus of claim 19, further comprising means for reporting the measurement.

21. The apparatus of claim 19, wherein the means for determining is configured to receive, from the serving cell, the RPI for both the serving cell and the one or more non-serving cells.

22. The apparatus of claim 21, wherein a neighbor list from the serving cell carries the RPI in a system information block (SIB).

23. The apparatus of claim 19, wherein the means for determining is configured to:
receive, from the serving cell, RPI for the serving cell; and
derive RPI for the one or more non-serving cells based on the RPI for the serving cell.

24. The apparatus of claim 23, wherein deriving the RPI for the one or more non-serving cells comprises considering the RPI for the one or more non-serving cells to be the same as the RPI for the serving cell.

25. The apparatus of claim 23, wherein deriving the RPI for the one or more non-serving cells comprises performing blind detection based on performing the radio resource measurement for the received subframes.

26. The apparatus of claim 19, wherein the means for determining is configured to receive, from the one or more non-serving cells, RPI for the one or more non-serving cells.

27. The apparatus of claim 26, wherein receiving the RPI for the one or more non-serving cells comprises reading a system information block type 1 (SIB1) from the one or more non-serving cells.

28. The apparatus of claim 26, wherein the RPI for the one or more non-serving cells is carried in a master information block (MIB).

29. The apparatus of claim 19, wherein the radio resource measurement is a measurement of reference signal receive quality (RSRQ) based on a received signal strength indicator (RSSI) in the determined set of subframes and on a reference signal receive power (RSRP) of an interfering cell from among the one or more non-serving cells.

30. The apparatus of claim 19, wherein the radio resource measurement comprises an intra-frequency radio resource measurement associated with the serving cell or the one or more non-serving cells.

31. The apparatus of claim 19, wherein the radio resource measurement comprises an inter-frequency or an inter-RAT (radio access technology) radio resource measurement associated with the one or more non-serving cells.

32. The apparatus of claim 31, wherein the means for performing is configured to perform the inter-frequency or the inter-RAT radio resource measurement for the determined set of subframes during a measurement gap longer than 6 ms.

33. The apparatus of claim 32, wherein the measurement gap lasts at least 10 ms.

34. The apparatus of claim 31, wherein the means for performing is configured to perform the inter-frequency or the inter-RAT radio resource measurement for the determined set of subframes during multiple measurement gaps.

35. The apparatus of claim 31, further comprising means for sending a request to shift a measurement gap for the inter-frequency or the inter-RAT radio resource measurement to coincide with the determined set of subframes.

36. The apparatus of claim 35, wherein the request to shift is based on the RPI of the cells.

37. An apparatus for wireless communications, comprising:
  a receiver configured to receive transmissions, at a user equipment (UE), from a plurality of cells, the transmissions occurring during a plurality of subframes, and the plurality of cells including a serving cell and one or more non-serving cells; and
  at least one processor configured to:
  determine a set of subframes, from the plurality of subframes, to include in a radio resource measurement, the set of subframes being based on resource partitioning information (RPI), the RPI being associated with the plurality of cells, the set of subframes including at least one protected subframe associated with the serving cell, the at least one protected subframe being at least one subframe in which the one or more non-serving cells refrain from transmitting during at least a portion of the at least one protected subframes; and
  perform the radio resource measurement during the determined set of subframes.

38. The apparatus of claim 37, wherein the at least one processor is configured to report the measurement.

39. The apparatus of claim 37, wherein the at least one processor is configured to determine the subframes by receiving, from the serving cell, the RPI for both the serving cell and the one or more non-serving cells.

40. The apparatus of claim 39, wherein a neighbor list from the serving cell carries the RPI in a system information block (SIB).

41. The apparatus of claim 37, wherein the at least one processor is configured to determine the subframes by:
  receiving, from the serving cell, RPI for the serving cell; and
  deriving RPI for the one or more non-serving cells based on the RPI for the serving cell.

42. The apparatus of claim 41, wherein the deriving comprises considering the RPI for the one or more non-serving cells to be the same as the RPI for the serving cell.

43. The apparatus of claim 41, wherein the deriving comprises performing blind detection based on performing the radio resource measurement for the received subframes.

44. The apparatus of claim 37, wherein the at least one processor is configured to determine the subframes by receiving, from the one or more non-serving cells, RPI for the one or more non-serving cells.

45. The apparatus of claim 44, wherein receiving the RPI for the one or more non-serving cells comprises reading a system information block type 1 (SIB1) from the one or more non-serving cells.

46. The apparatus of claim 44, wherein the RPI for the one or more non-serving cells is carried in a master information block (MIB).

47. The apparatus of claim 37, wherein the radio resource measurement is a measurement of reference signal receive quality (RSRQ) based on a received signal strength indicator (RSSI) in the determined set of subframes and on a reference signal receive power (RSRP) of an interfering cell from among the one or more non-serving cells.

48. The apparatus of claim 37, wherein the radio resource measurement comprises an intra-frequency radio resource measurement associated with the serving cell or the one or more non-serving cells.

49. The apparatus of claim 37, wherein the radio resource measurement comprises an inter-frequency or an inter-RAT (radio access technology) radio resource measurement associated with a the one or more non-serving cells.

50. The apparatus of claim 49, wherein the at least one processor is configured to perform the radio resource measurement by performing the inter-frequency or the inter-RAT radio resource measurement for the determined set of subframes during a measurement gap longer than 6 ms.

51. The apparatus of claim 50, wherein the measurement gap lasts at least 10 ms.

52. The apparatus of claim 49, wherein the at least one processor is configured to perform the radio resource measurement by performing the inter-frequency or the inter-RAT radio resource measurement for the determined set of subframes during multiple measurement gaps.

53. The apparatus of claim 49, further comprising a transmitter configured to send a request to shift a measurement gap for the inter-frequency or the inter-RAT radio resource measurement to coincide with the determined set of subframes.

54. The apparatus of claim 53, wherein the request to shift is based on the RPI of the cells.

55. A computer-program product for wireless communications stored on a non-transitory computer-readable medium, and comprising code for:
  receiving transmissions, at a user equipment (UE), from a plurality of cells, the transmissions occurring during a plurality of subframes, and the plurality of cells including a serving cell and one or more non-serving cells;
  determining a set of subframes, from the plurality of subframes, to include in a radio resource measurement, the set of subframes being based on resource partitioning information (RPI), the RPI being associated with the plurality of cells, the set of subframes including at least one protected subframe associated with the serving cell, the at least one protected subframe being at least one subframe in which the one or more non-serving cells refrain from transmitting during at least a portion of the at least one protected subframe; and
  performing the radio resource measurement during the determined set of subframes.

56. The computer-program product of claim 55, further comprising code for reporting the measurement.

57. The computer-program product of claim 55, wherein the determining comprises receiving, from the serving cell, the RPI for both the serving cell and the one or more non-serving cells.

58. The computer-program product of claim 57, wherein a neighbor list from the serving cell carries the RPI in a system information block (SIB).

59. The computer-program product of claim 55, wherein the determining comprises:
  receiving, from the serving cell, RPI for the serving cell; and
  deriving RPI for the one or more non-serving cells based on the RPI for the serving cell.

60. The computer-program product of claim 59, wherein the deriving comprises considering the RPI for the one or more non-serving cells to be the same as the RPI for the serving cell.

61. The computer-program product of claim 59, wherein the deriving comprises performing blind detection based on performing the radio resource measurement for the received subframes.

62. The computer-program product of claim 55, wherein the determining comprises receiving, from the one or more non-serving cells, RPI for the one or more non-serving cells.

63. The computer-program product of claim 62, wherein receiving the RPI for the one or more non-serving cells comprises reading a system information block type 1 (SIB1) from the one or more non-serving cells.

64. The computer-program product of claim 62, wherein the RPI for the one or more non-serving cells is carried in a master information block (MIB).

65. The computer-program product of claim 55, wherein the radio resource measurement is a measurement of reference signal receive quality (RSRQ) based on a received signal strength indicator (RSSI) in the determined set of subframes and on a reference signal receive power (RSRP) of an interfering cell from among the one or more non-serving cells.

66. The computer-program product of claim 55, wherein the radio resource measurement comprises an intra-frequency radio resource measurement associated with the serving cell or the one or more non-serving cells.

67. The computer-program product of claim 55, wherein the radio resource measurement comprises an inter-frequency or an inter-RAT (radio access technology) radio resource measurement associated with the one or more non-serving cells.

68. The computer-program product of claim 67, wherein the performing comprises performing the inter-frequency or the inter-RAT radio resource measurement for the determined set of subframes during a measurement gap longer than 6 ms.

69. The computer-program product of claim 68, wherein the measurement gap lasts at least 10 ms.

70. The computer-program product of claim 67, wherein the performing comprises performing the inter-frequency or the inter-RAT radio resource measurement for the determined set of subframes during multiple measurement gaps.

71. The computer-program product of claim 67, further comprising code for sending a request to shift a measurement gap for the inter-frequency or the inter-RAT radio resource measurement to coincide with the determined set of subframes.

72. The computer-program product of claim 71, wherein the request to shift is based on the RPI of the cells.

73. A method for wireless communications, comprising:
    determining, at a first base station, a measurement gap associated with a second base station for an inter-frequency or an inter-RAT (radio access technology) radio resource measurement;
    generating, at the first base station, resource partitioning information (RPI) with at least one subframe designated for radio resource measurements of the first base station; and
    transmitting subframes from the first base station according to the RPI, wherein the at least one subframe designated for radio resource measurements of the first base station falls within the measurement gap associated with the second base station.

74. The method of claim 73, wherein the first base station uses a different RAT than the second base station.

75. The method of claim 73, wherein the first base station uses a different frequency than the second base station.

76. The method of claim 73, wherein the at least one subframe comprises more than 2 subframes.

77. The method of claim 73, wherein the determining comprises receiving an indication of the measurement gap via a backhaul between the first and second base stations.

78. An apparatus for wireless communications, comprising:
    means for determining a measurement gap associated with a base station for an inter-frequency or an inter-RAT (radio access technology) radio resource measurement;
    means for generating resource partitioning information (RPI) with at least one subframe designated for radio resource measurements of the apparatus; and
    means for transmitting subframes from the apparatus according to the RPI, wherein the at least one subframe designated for radio resource measurements of the apparatus falls within the measurement gap associated with the base station.

79. The apparatus of claim 78, wherein the apparatus uses a different RAT than the base station.

80. The apparatus of claim 78, wherein the apparatus uses a different frequency than the base station.

81. The apparatus of claim 78, wherein the at least one subframe comprises more than 2 subframes.

82. The apparatus of claim 78, wherein the means for determining is configured to receive an indication of the measurement gap via a backhaul between the apparatus and the base station.

83. An apparatus for wireless communications, comprising:
    at least one processor configured to:
    determine a measurement gap associated with a base station for an inter-frequency or an inter-RAT (radio access technology) radio resource measurement; and
    generate resource partitioning information (RPI) with at least one subframe designated for radio resource measurements of the apparatus; and
    a transmitter configured to transmit subframes from the apparatus according to the RPI, wherein the at least one subframe designated for radio resource measurements of the apparatus falls within the measurement gap associated with the base station.

84. The apparatus of claim 83, wherein the apparatus uses a different RAT than the base station.

85. The apparatus of claim 83, wherein the apparatus uses a different frequency than the base station.

86. The apparatus of claim 83, wherein the at least one subframe comprises more than 2 subframes.

87. The apparatus of claim 83, wherein the at least one processor is configured to determine the measurement gap by receiving an indication of the measurement gap via a backhaul between the apparatus and the base station.

88. A computer-program product for wireless communications, the computer-program product comprising:
    a non-transitory computer-readable medium having code for:
    determining, at a first base station, a measurement gap associated with a second base station for an inter-frequency or an inter-RAT (radio access technology) radio resource measurement;
    generating, at the first base station, resource partitioning information (RPI) with at least one subframe designated for radio resource measurements of the first base station; and transmitting subframes from the first base station according to the RPI, wherein the at least one subframe designated for radio resource measurements of the first base station falls within the measurement gap associated with the second base station.

89. The computer-program product of claim 88, wherein the first base station uses a different RAT than the second base station.

90. The computer-program product of claim 88, wherein the first base station uses a different frequency than the second base station.

91. The computer-program product of claim 88, wherein the at least one subframe comprises more than 2 subframes.

92. The computer-program product of claim 88, wherein the determining comprises receiving an indication of the measurement gap via a backhaul between the first and second base stations.

* * * * *